United States Patent
Matsuzawa et al.

(10) Patent No.: US 10,907,062 B2
(45) Date of Patent: Feb. 2, 2021

(54) OIL-BASED INKJET INK AND METHOD FOR PRODUCING OIL-BASED INKJET INK

(71) Applicant: RISO KAGAKU CORPORATION, Tokyo (JP)

(72) Inventors: Tomohiro Matsuzawa, Ibaraki (JP); Yoshifumi Watanabe, Ibaraki (JP); Naofumi Ezaki, Ibaraki (JP); Yasuo Yamamoto, Ibaraki (JP); Mitsuko Kitanohara, Ibaraki (JP); Manami Shimizu, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 111 days.

(21) Appl. No.: 16/428,147

(22) Filed: May 31, 2019

(65) Prior Publication Data

US 2020/0002557 A1 Jan. 2, 2020

(30) Foreign Application Priority Data

Jun. 29, 2018 (JP) ................................. 2018-124797

(51) Int. Cl.
| | | |
|---|---|---|
| *C09D 11/36* | (2014.01) | |
| *C09D 11/033* | (2014.01) | |
| *C09D 11/037* | (2014.01) | |
| *C09D 11/102* | (2014.01) | |
| *C09D 11/322* | (2014.01) | |

(52) U.S. Cl.
CPC ............ *C09D 11/36* (2013.01); *C09D 11/033* (2013.01); *C09D 11/037* (2013.01); *C09D 11/102* (2013.01); *C09D 11/322* (2013.01)

(58) Field of Classification Search
CPC ...... C09D 11/36; C09D 11/033; C09D 11/037; C09D 11/102; C09D 11/322; C09D 11/30
See application file for complete search history.

(56) References Cited

U.S. PATENT DOCUMENTS

| | | | |
|---|---|---|---|
| 6,723,820 B1* | 4/2004 | Arcurio .................. | C08G 18/12 156/277 |
| 2008/0122915 A1* | 5/2008 | Madaras ................ | C09D 11/36 347/100 |
| 2008/0257212 A1* | 10/2008 | Ganapathiappan .. | C09D 11/326 106/31.75 |
| 2013/0289185 A1* | 10/2013 | Oya ...................... | C09D 11/102 524/389 |
| 2017/0015854 A1* | 1/2017 | Shimizu ............... | C09D 101/18 |

FOREIGN PATENT DOCUMENTS

| | | |
|---|---|---|
| EP | 3296371 | 3/2018 |
| JP | 2011-57812 A | 3/2011 |

OTHER PUBLICATIONS

The extended European Search Report issued for European patent application No. 19177587.3, dated Nov. 14, 2019, 5 pages.

* cited by examiner

*Primary Examiner* — Alexander C Kollias
(74) *Attorney, Agent, or Firm* — Hamre, Schumann, Mueller & Larson, P.C.

(57) ABSTRACT

An oil-based inkjet ink is disclosed that contains colored resin particles, an ionic dispersant and a non-aqueous solvent, wherein the colored resin particles contain a colorant and a urethane-urea resin. A method for producing an oil-based inkjet ink is also disclosed.

18 Claims, No Drawings

OIL-BASED INKJET INK AND METHOD FOR PRODUCING OIL-BASED INKJET INK

CROSS REFERENCE TO RELATED APPLICATIONS

This application is based upon and claims the benefit of priority from the prior Japanese Patent Application No. 2018-124797, filed on Jun. 29, 2018, the entire contents of which are incorporated by reference herein.

BACKGROUND OF THE INVENTION

Field of the Invention

Embodiments of the present invention relate to an oil-based inkjet ink and a method for producing an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

JP 2011-57812 A discloses the use, in an oil-based inkjet ink, of an encapsulated pigment that has been surface-treated with a comb-like polyurethane compound that has a compound with an α-value of 5 to 60 added as a side chain and is miscible with the solvent.

SUMMARY OF THE INVENTION

An embodiment of the present invention relates to an oil-based inkjet ink containing colored resin particles, an ionic dispersant and a non-aqueous solvent, wherein the colored resin particles contain a colorant and a urethane-urea resin.

Another embodiment of the present invention relates to a method for producing an oil-based inkjet ink that includes producing a water-in-oil emulsion containing a continuous phase that contains a non-aqueous solvent and an ionic dispersant, and a dispersed phase that contains water, a colorant and a water-dispersible urethane-urea resin, and removing the water from the water-in-oil emulsion.

DETAILED DESCRIPTION OF THE EMBODIMENTS

Embodiments of the present invention are described below in further detail, but the following embodiments in no way limit the present invention. In the following description, an oil-based inkjet ink is sometimes referred to as simply an "ink" or an "oil-based ink".

In inkjet printing, when a printed item is transported by rollers inside the inkjet printer immediately following printing, the ink on the freshly printed item may sometimes adhere to the surface of the rollers in the inkjet printer, such as the drive roller or a driven roller, and this ink may then be transferred from the roller surface and adhere to a subsequently transported recording medium, causing contamination (hereafter sometimes referred to as "roller transfer contamination").

An oil-based inkjet ink of an embodiment of the present invention contains colored resin particles, an ionic dispersant and a non-aqueous solvent, wherein the colored resin particles contain a colorant and a urethane-urea resin.

A urethane-urea resin contains a soft segment composed of a polyol component having weak cohesive force and a hard segment composed of urethane groups (—NH—CO—O—) and urea groups (—NH—CO—NH—) having a powerful cohesive force, and may exhibit excellent balance between adhesion, abrasion resistance and flexibility.

When an ink of the present embodiment containing an ionic dispersant and colored resin particles containing a urethane-urea resin is used, roller transfer contamination may be reduced. Further, when this ink is used, improved rub fastness of the printed item image tends to also be obtainable.

Although there are no particular limitations on the method used for producing this oil-based inkjet ink, the ink may be produced, for example, by a method described below that employs in-oil drying of a water-in-oil (W/O) emulsion.

The colored resin particles contained in the oil-based inkjet ink may contain a pigment, a dye, or a combination thereof as the colorant.

Examples of pigments include organic pigments, examples thereof including azo pigments, phthalocyanine pigments, polycyclic pigments and dye lake pigments, and inorganic pigments, examples thereof including carbon blacks and metal oxides.

Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. One of these pigments may be used alone, or a combination of two or more of these pigments may be used.

From the viewpoints of the discharge stability and the storage stability, the average particle size of the pigment is preferably not more than 300 nm, and more preferably 200 nm or less.

The amount of the pigment, relative to the total mass of the ink, may be typically from 0.01 to 20% by mass, and from the viewpoints of the image density and the ink viscosity, is preferably from 1 to 15% by mass.

For example, in the case where the oil-based inkjet ink is produced using a method that employs in-oil drying of a water-in-oil (W/O) emulsion, the pigment is preferably used in the form of a water dispersion in which the pigment is dispersed in water. A self-dispersing pigment obtained by bonding a water-solubilizing group such as a carboxyl group, a carbonyl group, a hydroxyl group or a sulfo group to the pigment surface, thereby enabling the pigment itself to undergo dispersion in water, may be used as the pigment. For example, a water dispersion of a self-dispersing pigment can be used favorably. It is also preferable to disperse the pigment in water using a pigment dispersant such as a water-soluble nonionic dispersant described below. In those cases where a water dispersion is used, the water contained in the water dispersion is preferably removed during the ink production process.

In terms of dyes, any of the dyes typically used in this technical field may be used. From the viewpoint of reducing strike-through, a dye that either exhibits poor solubility or is insoluble in the non-aqueous solvent contained in the ink is preferred. In the case where the oil-based inkjet ink is produced using a method that employs in-oil drying of a water-in-oil (W/O) emulsion, the use of a dye that either dissolves or disperses in water is preferred.

Examples of dyes that can be used favorably as the dye include water-soluble dyes and dyes that can be made water-soluble upon reduction or the like, selected from among basic dyes, acid dyes, direct dyes, soluble vat dyes, acid mordant dyes, mordant dyes, reactive dyes, vat dyes and sulfide dyes. Examples of the dyes that can be favorably used further include dispersible dyes, examples thereof including azo-based dyes, anthraquinone-based dyes, azomethine-based dyes and nitro-based dyes. One of these dyes may be used alone, or a combination of a plurality of dyes may be used.

The amount of the dye, relative to the total mass of the ink, may be typically from 0.01 to 20% by mass, and from the viewpoints of the image density and the ink viscosity, is preferably from 1 to 15% by mass, and more preferably from 5 to 10% by mass.

The colored resin particles may contain a urethane-urea resin. A "urethane-urea resin" is a urethane resin having a urethane group and a urea group.

The urethane group (—NH—CO—O—) of urethane resins may be generally obtained by reaction between a polyol and a polyisocyanate. A urethane-urea resin can be obtained, for example, by subjecting a urethane prepolymer obtained using materials including a polyol and a polyisocyanate to a reaction with water and/or a polyamine compound, thereby reacting the isocyanate group of the urethane prepolymer with the water and/or a polyamine compound to produce a urea group and extend the chain.

Any one or more of a urethane-urea resin having an acidic group, a urethane-urea resin having a basic group, a urethane-urea resin having neither an acidic group nor a basic group (a nonionic urethane-urea resin) may be used as the urethane-urea resin. From the viewpoint of reducing roller transfer contamination, a urethane-urea resin having an acidic group or a urethane-urea resin having a basic group is preferably included. From the viewpoints of roller transfer contamination, rub fastness and ink viscosity, a urethane-urea resin having an acidic group is preferably included. In a case in which a urethane-urea resin having an acidic group is used, roller transfer contamination can be further reduced, and the rub fastness may tend to improve further. Further, a lower ink viscosity tends to be obtainable.

Examples of the acidic group include a carboxyl group and a sulfo group and the like.

It is thought that the urethane-urea resin having an acidic group may have the ability to better suppress aggregation when a shearing force is applied during ink production.

For example, a urethane-(meth)acrylic resin having a urethane group and a urea group may be used as the urethane-urea resin. The urethane-(meth)acrylic resin having a urethane group and a urea group preferably also has an acidic group. A resin produced using a (meth)acrylic resin having a plurality of hydroxyl groups as the polyol can be used favorably as the urethane-(meth)acrylic resin having a urethane group and a urea group. A (meth)acrylic resin means a resin containing a methacrylic unit, a resin containing an acrylic unit, or a resin containing both of these types of units. This definition also applies to (meth)acrylic resins described below.

From the viewpoints of the storage stability, roller transfer contamination and rub fastness, the urethane-urea resin is preferably a resin produced using an aliphatic polyisocyanate as the polyisocyanate. It is thought that urethane-urea resins obtained using an aliphatic polyisocyanate are able to further contribute to improving the rub fastness and reducing roller transfer contamination.

The urethane-urea resin preferably exhibits a degree of solubility in the non-aqueous solvent of the ink, expressed as the mass of the urethane-urea resin that can be dissolved in 100 g of the ink non-aqueous solvent at 23° C., that is preferably 1 g or less. If the solubility of the urethane-urea resin in the non-aqueous solvent is lowered, then it is thought that when the non-aqueous solvent penetrates into the interior of the recording medium, the colored resin particles may separate more readily from the non-aqueous solvent and may be more readily retained at the surface of the recording medium. Accordingly, when the solubility in the non-aqueous solvent of the ink is a value of not more than 1 g of the urethane-urea resin per 100 g of the ink non-aqueous solvent at 23° C., a reduction in strike-through and improved image density tend to be more easily obtainable. Moreover, it is thought that ensuring that the urethane-urea resin is only sparingly soluble in the non-aqueous solvent may also contribute to a reduction in the ink viscosity.

The weight average molecular weight of the urethane-urea resin is preferably from 5,000 to 50,000, and more preferably from 10,000 to 30,000.

The weight average molecular weight of the urethane-urea resin refers to a value determined by the GPC method relative to standard polystyrenes. This also applies to weight average molecular weight values described below for resins and the like.

For example, in the case where the oil-based inkjet ink is produced using a method that employs in-oil drying of a water-in-oil (W/O) emulsion, a water-dispersible urethane-urea resin is preferably used as the urethane-urea resin. The term "water-dispersible" means having a property wherein the resin can be dispersed in water in particulate form without dissolving in the water. The water-dispersible urethane-urea resin is preferably added, for example, in the form of a resin particle dispersion (resin emulsion) prepared by dispersing the resin in advance in a liquid such as water. In those cases where a water dispersion is used, the water contained in the water dispersion is preferably removed during the ink production process. The water-dispersible urethane-urea resin preferably has an acidic group.

Examples of commercially available urethane-urea resins include commercially available water dispersions such as WS5984 and WS4022 manufactured by Mitsui Chemicals, Inc., SUPERFLEX 740, SUPERFLEX 150H, SUPERFLEX 500M and SUPERFLEX 620 manufactured by DKS Co., Ltd., and DAOTAN VTW1262 manufactured by Daicel Allnex Ltd. Among these, examples of commercially available urethane-urea resins that use a (meth)acrylic resin having a plurality of hydroxyl groups as the polyol include DAOTAN VTW1262 manufactured by Daicel Allnex Ltd. Further, examples of commercially available urethane-urea resins having an acidic group include WS5984 and WS4022 manufactured by Mitsui Chemicals, Inc., SUPERFLEX 740 and SUPERFLEX 150H manufactured by DKS Co., Ltd., and DAOTAN VTW1262 manufactured by Daicel Allnex Ltd.

A single urethane-urea resin may be used alone, or a combination of two or more urethane-urea resin resins may be used.

The amount of the urethane-urea resin may be adjusted as appropriate. For example, from the viewpoints of reduced strike-through, rub fastness, roller transfer contamination and storage stability, the amount of the urethane-urea resin, relative to the total mass of the ink, is preferably at least 0.1% by mass, more preferably at least 0.5% by mass, even more preferably at least 1% by mass, and still more preferably 3% by mass or greater. On the other hand, from the viewpoint of the ink viscosity, the amount of the urethane-urea resin, relative to the total mass of the ink, is preferably not more than 30% by mass, more preferably not more than 20% by mass, even more preferably not more than 15% by mass, and still more preferably 10% by mass or less. For example, the amount of the urethane-urea resin, relative to the total mass of the ink, is preferably from 0.1 to 30% by mass, more preferably from 0.5 to 20% by mass, even more preferably from 1 to 15% by mass, and still more preferably from 3 to 10% by mass.

For example, from the viewpoints of reduced strike-through, rub fastness, roller transfer contamination and storage stability, the amount of the urethane-urea resin, relative to the total mass of the colored resin particles solid fraction, is preferably at least 1% by mass, more preferably at least 5% by mass, even more preferably at least 10% by mass, and still more preferably 20% by mass or greater. On the other hand, from the viewpoint of the ink viscosity, the amount of the urethane-urea resin, relative to the total mass of the colored resin particles solid fraction, is preferably not more than 70% by mass, more preferably not more than 60% by mass, and even more preferably 50% by mass or less. For example, the amount of the urethane-urea resin, relative to the total mass of the colored resin particles solid fraction, is preferably from 1 to 70% by mass, more preferably from 5 to 70% by mass, even more preferably from 10 to 60% by mass, and still more preferably from 20 to 50% by mass.

In those cases where the colored resin particles also contain a resin other than the urethane-urea resin, the total amount of resin within the colored resin particles, relative to the total mass of the ink, and the total amount of resin within the colored resin particles, relative to the total mass of the colored resin particles, may each fall within the respective range described above for the amount of the urethane-urea resin.

The colored resin particles may, for example, also contain another resin. Examples of this other resin include a (meth)acrylic resin, a polyester resin, a (meth)acrylic silicone resin, a vinyl chloride resin, and styrene-(meth)acrylic resin. Among these a (meth)acrylic resin is preferred, as such resins are thought to contribute to improved rub fastness, a further reduction in roller transfer contamination, and a lowering of the ink viscosity.

The (meth)acrylic resin that may be included in the colored resin particles is described below in further detail.

The (meth)acrylic resin preferably has an acidic group. Examples of the acidic group include a carboxyl group (—COOH) and a sulfo group, and a carboxyl group is more preferred. The (meth)acrylic resin may contain only one type, or may contain a plurality of types, of the acidic group.

The (meth)acrylic resin may, for example, contain a unit having an acidic group (hereafter sometimes referred to as "unit c"). The unit c may be an acrylic unit or a methacrylic unit.

The unit c may be a unit in which the acidic group is bonded directly to a carbon atom in the main chain of the (meth)acrylic resin, or may be a unit in which the acidic group is bonded via a linking group to a carbon atom in the main chain of the (meth)acrylic resin.

In those cases where the unit c has a carboxyl group, the carboxyl group of the unit c may be bonded directly to a carbon atom in the main chain of the (meth)acrylic resin. In such cases, examples of the unit c include units derived from acrylic acid and/or methacrylic acid.

Alternatively, the carboxyl group of the unit c may be bonded via a linking group to a carbon atom in the main chain of the (meth)acrylic resin. Examples of this type of unit c include units having a carboxyl group at the terminal, such as units in which a group represented by —COOR$^c$ is bonded to a carbon atom of the main chain, wherein R$^c$ is a group represented by —R$^{c1}$—COOH, and R$_{c1}$ is an arbitrary divalent or a higher valent group. The unit c may have two or more terminal acidic groups, and for example, may have two or more carboxyl groups at the terminals.

Examples of the unit c include units derived from a monomer c described below.

The (meth)acrylic resin may contain only one type, or may contain a plurality of types, of the unit c.

The (meth)acrylic resin preferably has a group containing an aromatic ring. Examples of the aromatic ring include a benzene ring, a naphthalene ring, an anthracene ring, or substituted versions of these rings, and a benzene ring is preferred.

Examples of the group containing an aromatic ring include a benzyl group and a phenyl group, and a benzyl group is preferred.

The (meth)acrylic resin may contain only one type, or may contain a plurality of types, of the group containing an aromatic ring.

The (meth)acrylic resin may, for example, contain a unit having a group containing an aromatic ring (hereafter sometimes referred to as "unit a"). The unit a may, for example, be an acrylic unit or a methacrylic unit.

Examples of the unit a include units in which a functional group represented by —COOR$^a$ is bonded to a carbon atom of the main chain. R$^a$ is a group containing an aromatic ring.

Further, R$^a$ may be a group represented by —R$^{a1}$-R$^{a2}$, wherein R$^{a1}$ represents an arbitrary divalent or a higher valent linking group, and the terminal represented by R$^{a2}$ has an aromatic ring. The unit a may have two or more terminal aromatic rings.

Examples of the unit a include units derived from a monomer a described below.

The (meth)acrylic resin may contain only one type, or may contain a plurality of types, of the unit a.

The (meth)acrylic resin preferably has a β-dicarbonyl group.

Preferred examples of the 3-dicarbonyl group include β-diketone groups such as an acetoacetyl group and a propionacetyl group, and β-keto acid ester groups such as an acetoacetoxy group and a propionacetoxy group. The (meth) acrylic resin may contain only one type, or may contain a plurality of types, of these groups.

The (meth)acrylic resin may, for example, contain a unit having β-dicarbonyl group (hereafter sometimes referred to as "unit b"). The unit b may, for example, be an acrylic unit or a methacrylic unit.

Examples of the unit b include units in which a carbonyl group is bonded to a carbon atom of the main chain, and a β-dicarbonyl group is then bonded to the carbon atom of that carbonyl group, either directly or via a linking group.

The unit b is preferably a unit derived from a (meth) acrylate having a β-dicarbonyl group, or a unit derived from a (meth)acrylamide having a β-dicarbonyl group, or the like. Preferred examples of (meth)acrylates having a β-dicarbonyl group include (meth)acrylates having a β-diketone group or a β-keto acid ester group bonded indirectly to the carbon atom of the carbonyl (CO) of an acryloyl group or methacryloyl group. Preferred examples of (meth)acrylamides having a β-dicarbonyl group include (meth)acrylamides having a β-diketone group or a β-keto acid ester group bonded indirectly to the carbon atom of the carbonyl (CO) of an acryloyl group or methacryloyl group. Examples of the unit b include units derived from a monomer b described below.

The (meth)acrylic resin may contain only one type, or may contain a plurality of types, of the unit b.

The term "(meth)acrylate" means an acrylate, a methacrylate, or a combination thereof. Further, a "(meth)acrylamide" means an acrylamide, a methacrylamide, or a combination thereof. These definitions also apply to subsequent mentions of (meth)acrylates and (meth)acrylamides.

The (meth)acrylic resin preferably has a group containing an aromatic ring and/or a β-dicarbonyl group. It is thought that when the (meth)acrylic resin has a group containing an aromatic ring and/or a β-dicarbonyl group, the affinity of the (meth)acrylic resin relative to the colorant can be further improved. Accordingly, it is thought that, in the ink, the (meth)acrylic resin may be disposed near the colorant, and may function as a mutual binder for the urethane-urea resin and the colorant, and, therefore, tougher colored resin particles may be obtained, resulting in further contributions to improved rub fastness, reduced strike-through and lower ink viscosity.

The (meth)acrylic resin may have an alkyl group of 1 to 8 carbon atoms. For example, the (meth)acrylic resin may include a unit having an alkyl group of 1 to 8 carbon atoms (hereafter sometimes referred to as "unit d").

The alkyl group of 1 to 8 carbon atoms is more preferably an alkyl group of 1 to 4 carbon atoms. Examples of the alkyl group of 1 to 8 carbon atoms include a methyl group, an ethyl group, a butyl group and a 2-ethylhexyl group. The (meth)acrylic resin may include only one type, or may contain a plurality of types, of the alkyl group of 1 to 8 carbon atoms.

The unit d may, for example, be an acrylic unit or a methacrylic unit.

Examples of the unit d include units in which a group represented by —COOR$^d$ is bonded to a carbon atom of the main chain of the (meth)acrylic resin, wherein R$^d$ is an alkyl group of 1 to 8 carbon atoms (and preferably 1 to 4 carbon atoms).

Examples of the unit d include units derived from a monomer d described below.

The (meth)acrylic resin may contain only one type, or may contain a plurality of types, of the unit d.

The (meth)acrylic resin may have a hydroxyl group. For example, the (meth)acrylic resin may include a unit having a hydroxyl group (hereafter sometimes referred to as "unit e").

The unit e may, for example, be an acrylic unit or a methacrylic unit.

Examples of the unit e include units in which a functional group represented by —COOR$^e$ is bonded to a carbon atom of the main chain, wherein R$^e$ is a group having a hydroxyl group. In this case, it is preferable that an alkyl group of 1 to 8 carbon atoms is bonded to the oxygen atom in the functional group represented by —COOR$^e$, and that at least one of the hydrogen atoms of this alkyl group is substituted with a hydroxyl group. Preferred examples include units in which R$^e$ represents a hydroxyethyl group, a hydroxypropyl group, or a hydroxybutyl group or the like.

Examples of the unit e include units derived from a monomer e described below. The (meth)acrylic resin may contain only one type, or may contain a plurality of types, of the unit e.

Examples of the (meth)acrylic resin include resins having an acidic group, a group containing an aromatic ring, and a 3-dicarbonyl group. The colored resin particles preferably contain a (meth)acrylic resin having an acidic group, a group containing an aromatic ring, and a β-dicarbonyl group. Examples of this type of (meth)acrylic resin include (meth) acrylic resins containing the unit a, the unit b and the unit c. The (meth)acrylic resin containing the unit a, the unit b and the unit c may be, for example, a (meth)acrylic resin which also contains the unit d and/or the unit e in addition to the unit a, the unit b and the unit c.

In the (meth)acrylic resin, the amount of the unit a, relative to the total mass of the polymer, is preferably from 5 to 50% by mass, more preferably from 8 to 40% by mass, and even more preferably from 10 to 30% by mass.

In the (meth)acrylic resin, the amount of the unit b, relative to the total mass of the polymer, is preferably from 5 to 50% by mass, more preferably from 8 to 40% by mass, and even more preferably from 10 to 30% by mass.

In the (meth)acrylic resin, the amount of the unit c, relative to the total mass of the polymer, is preferably from 5 to 90% by mass.

In the (meth)acrylic resin, the amount of the unit d, relative to the total mass of the polymer, is preferably from 5 to 90% by mass.

In the (meth)acrylic resin, the amount of the unit e, relative to the total mass of the polymer, is preferably from 5 to 90% by mass.

Here, the total mass of the polymer is based on the combined mass of all of the units that constitute the (meth) acrylic resin.

The (meth)acrylic resin can be produced, for example, by polymerizing one of the monomers a to e described below, or by copolymerizing a monomer mixture containing one or more monomers selected from among monomers having a group containing an aromatic ring (hereafter sometimes referred to as "monomer a"), monomers having a β-dicarbonyl group (hereafter sometimes referred to as "monomer b"), monomers having an acidic group (hereafter sometimes referred to as "monomer c"), monomers having an alkyl group of 1 to 8 carbon atoms (hereafter sometimes referred to as "monomer d") and monomers having a hydroxyl group (hereafter sometimes referred to as "monomer e") (for example, a monomer mixture containing monomers a to c, or a monomer mixture containing monomers a to e).

The monomer a is, for example, preferably a monomer having an acryloyl group or a methacryloyl group and a group containing an aromatic ring. Preferred examples of the monomer a include (meth)acrylates having a group containing an aromatic ring. Specific examples of the monomer a include benzyl (meth)acrylate, phenoxyethyl methacrylate, phenoxypolyethylene glycol (meth)acrylate, phenoxypolyethylene glycol polypropylene glycol (meth)acrylate, nonylphenoxypolypropylene glycol acrylate, and nonylphenoxypolyethylene glycol polypropylene glycol acrylate.

The monomer b is, for example, preferably a monomer having an acryloyl group or a methacryloyl group and a β-dicarbonyl group. Preferred examples of the monomer b include (meth)acrylates having a β-dicarbonyl group and (meth)acrylamides having a β-dicarbonyl group. Specific examples of the monomer b include acetoacetoxyalkyl (meth)acrylates such as acetoacetoxyethyl (meth)acrylate, hexadione (meth)acrylate, and acetoacetoxyalkyl (meth)acrylamides such as acetoacetoxyethyl (meth)acrylamide.

The monomer c is, for example, preferably a monomer having a carboxyl group and a group containing a carbon-carbon double bond. Specific examples of the monomer c include methacrylic acid, acrylic acid, β-carboxyethyl (meth)acrylate, 2-methacryloyloxyethyl hexahydrophthalic acid (CAS number: 51252-88-1), and 4-[2-(methacryloyloxy)ethoxy]-4-oxo-2-butenoic acid (CAS No. 51978-15-5).

The monomer d is, for example, preferably a monomer having an acryloyl group or a methacryloyl group and an alkyl group of 1 to 8 carbon atoms. Preferred examples of the monomer d include alkyl (meth)acrylates having an alkyl group of 1 to 8 carbon atoms. Specific examples of the monomer d include methyl (meth)acrylate, ethyl (meth)acrylate, butyl (meth)acrylate, and 2-ethylhexyl (meth)acrylate.

The monomer e is, for example, preferably a monomer having an acryloyl group or a methacryloyl group and a hydroxyl group. Preferred examples of the monomer e include (meth)acrylates having a hydroxyl group. Specific examples of the monomer e include hydroxyethyl (meth)acrylate, 2-hydroxypropyl (meth)acrylate, and 4-hydroxybutyl (meth)acrylate.

For each of the above monomers a to e, a single monomer may be used alone, or a combination of two or more monomers may be used. For example, one monomer a may be used singly, or two or more monomers a may be used in combination. For example, one monomer b may be used singly, or two or more monomers b may be used in combination. For example, one monomer c may be used singly, or two or more monomers c may be used in combination. For example, one monomer d may be used singly, or two or more monomers d may be used in combination. For example, one monomer e may be used singly, or two or more monomers e may be used in combination.

One or more other monomers may also be used in the (meth)acrylic resin.

The monomer mixture described above can be polymerized by, for example, conventional radical copolymerization. The reaction is preferably conducted as either a solution polymerization or a dispersion polymerization.

During the polymerization reaction, appropriate amounts of a polymerization initiator, a chain transfer agent, a polymerization inhibitor, a polymerization promoter and/or a dispersant or the like may be added to the reaction system to regulate the reaction rate.

Examples of polymerization initiators that may be used include thermal polymerization initiators, including azo compounds such as AIBN (azobisisobutyronitrile), 2,2'-azobis(2,4-dimethylvaleronitrile) and 2,2'-azobis(4-methoxy-2,4-dimethylvaleronitrile), and peroxides such as t-butyl peroxybenzoate and t-butylperoxy-2-ethylhexanoate. Alternatively, a photopolymerization initiator which generates radicals upon irradiation with an active energy beam may also be used.

Using a chain transfer agent in the reaction system, the molecular weight of the obtained (meth)acrylic resin can be adjusted. Examples of chain transfer agents that can be used favorably include thiols, examples of which include as n-butyl mercaptan, lauryl mercaptan, stearyl mercaptan and cyclohexyl mercaptan.

There are no particular limitations on the polymerization solvent (reaction solvent) used in a solution polymerization, but the solvent is preferably capable of dispersing or dissolving the resin produced by the polymerization.

The (meth)acrylic resin is not limited to (meth)acrylic resins of the above structure.

The weight average molecular weight of the (meth)acrylic resin is preferably from 10,000 to 200,000, and more preferably from 30,000 to 150,000.

The acid value of the (meth)acrylic resin is preferably from 15 to 100 mgKOH/g, and more preferably from 20 to 80 mgKOH/g.

The acid value describes the number of milligrams of potassium hydroxide required to neutralize all of the acidic components within 1 g of the non-volatile fraction.

For example, when the oil-based inkjet ink is produced by a method that employs in-oil drying of a water-in-oil (W/O) emulsion, a water-dispersible (meth)acrylic resin is preferably used as the (meth)acrylic resin. The term "water-dispersible" means having a property wherein the resin can be dispersed in water in particulate form without dissolving in the water. The water-dispersible (meth)acrylic resin is preferably added, for example, in the form of a resin particle dispersion (resin emulsion) prepared by dispersing the resin in advance in a liquid such as water. In those cases where a water dispersion is used, the water contained in the water dispersion is preferably removed during the ink production process.

A single (meth)acrylic resin may be used alone, or a combination of two or more (meth)acrylic resins may be used.

In those cases where the colored resin particles contain a (meth)acrylic resin, the amount of the (meth)acrylic resin may be adjusted as appropriate. The amount of the (meth)acrylic resin in the colored resin particles, relative to the total mass of the ink, is preferably at least 0.1% by mass, and more preferably 0.2% by mass or greater. Further, the amount of the (meth)acrylic resin in the colored resin particles, relative to the total mass of the ink, is preferably not more than 20% by mass, and more preferably 10% by mass or less. For example, the amount of the (meth)acrylic resin in the colored resin particles, relative to the total mass of the ink, is preferably from 0.1 to 20% by mass, and more preferably from 0.2 to 10% by mass.

In those cases where the colored resin particles contain a (meth)acrylic resin, the total amount of the urethane-urea resin and the (meth)acrylic resin in the colored resin particles, relative to the total mass of the ink, is preferably from 0.1 to 30% by mass, more preferably from 0.5 to 20% by mass, even more preferably from 1 to 15% by mass, and still more preferably from 3 to 10% by mass.

When the colored resin particles contain a (meth)acrylic resin, the amount of the (meth)acrylic resin relative to the total mass of the colored resin particles solid fraction is preferably from 0.5 to 40% by mass, and more preferably from 1 to 30% by mass.

The colored resin particles may also contain a pigment dispersant. It is preferable that the colorant includes a pigment, and that the colored resin particles also contain a pigment dispersant. Examples of the pigment dispersant include water-soluble basic (cationic) dispersants, water-soluble acidic (anionic) dispersants, and water-soluble nonionic dispersants. For example, when the oil-based inkjet ink is produced by a method that employs in-oil drying of a water-in-oil (W/O) emulsion, a water-soluble nonionic dispersant is preferred.

A water-soluble nonionic dispersant is a dispersant in which the hydrophilic group(s) do not have ion dissociability. Examples of the water-soluble nonionic dispersant, described in terms of the main bonds within the molecule, include ester-based water-soluble nonionic dispersants, ether-based water-soluble nonionic dispersants, and ester-ether-based water-soluble nonionic dispersants.

Ester-based water-soluble nonionic dispersants have a structure in which, for example, a polyhydric alcohol such as glycerol, sorbitol or sucrose and a fatty acid have reacted to form an ester linkage, and specific examples include glycerol fatty acid esters, sorbitan fatty acid esters, and sucrose fatty acid esters.

Ether-based water-soluble nonionic dispersants can be produced, for example, by adding mainly ethylene oxide to a raw material having a hydroxyl group such as a higher alcohol, an alkylphenol, an arylphenol or an arylalkylphenol, and examples include polyglycol ethers (such as aryl polyglycol ethers and alkyl polyglycol ethers). More specific examples include polyoxyethylene alkyl ethers, polyoxyethylene alkyl phenyl ethers, polyoxyethylene aryl phenyl ethers, and polyoxyethylene arylalkyl phenyl ethers.

Ester-ether-based water-soluble nonionic dispersants are, for example, compounds obtained by adding ethylene oxide to an ester formed from a polyhydric alcohol such as glycerol or sorbitol and a fatty acid. These compounds have both an ester linkage and an ether linkage within the molecule. Examples include fatty acid polyethylene glycol ether esters.

Examples of the water-soluble nonionic dispersant which may be used further include polycarboxylate polymers and polysiloxane copolymers.

One of these water-soluble nonionic dispersants may be used alone, or a combination of two or more of these water-soluble nonionic dispersants may be used.

More preferable examples of the water-soluble nonionic dispersant include fatty acid polyethylene glycol ether esters and polyglycol ethers (such as aryl polyglycol ethers).

It is thought that by using a water-soluble nonionic dispersant, the pigment may be dispersed more finely during the ink production process, and because this may enable the pigment to be coated efficiently with a polymer compound, the particle size of the colored resin particles may be better controlled, and the image density may be improved.

Further, when a water-soluble nonionic dispersant is used, in those cases where the resin included in the colored resin particles has an acidic group, pigment aggregation may be more easily prevented, and an ink having superior storage stability tends to be able to be produced.

One type of pigment dispersant may be used alone, or a combination of two or more types thereof may be used.

The amount of the pigment dispersant may be adjusted as appropriate. For example, the mass ratio of the pigment dispersant, relative to a value of 1 for the pigment, may be within a range from 0.1 to 5, and is preferably from 0.1 to 1. The amount of the pigment dispersant relative to the total mass of the ink may be from 0.01 to 10% by mass, and is preferably from 0.01 to 5% by mass.

When a water-soluble nonionic dispersant is included, the amount of the water-soluble nonionic dispersant, relative to the total mass of all the pigment dispersants, is preferably from 50 to 100% by mass, and more preferably from 70 to 100% by mass.

The ink may contain an ionic dispersant. An ionic dispersant is a dispersant that has a basic group or an acidic group. Examples of ionic dispersants include basic dispersants, which are dispersants having a basic (cationic) group, and acidic dispersants, which are dispersants having an acidic (anionic) group without having a basic group, but the ionic dispersant preferably includes a basic dispersant. It is thought that ionic dispersants may contribute to improved dispersion stability of the colored resin particles and improved ink storage stability, as well as contributing to a reduction in the ink viscosity and an improvement in the image density.

Basic dispersants are dispersants having a basic group. Examples of the basic group include an amino group, amide group, imino group, pyrrolidone group, morpholino group and nitrile group. Examples of the amino group include an unsubstituted amino group, and a substituted amino group. Examples of the substituted amino group include mono- or di-alkyl amino groups (such as a dimethylamino group). In the substituted amino group, the substituent such as an alkyl group may be further substituted with a substituent such as a hydroxyl group or an aryl group. Similarly, examples of the amide group include an unsubstituted amide group and a substituted amide group. Examples of the substituted amide group include mono- or di-alkyl amide groups (such as a dimethylamide group). In the substituted amide group, the substituent such as an alkyl group may be further substituted with a substituent such as a hydroxyl group or an aryl group. The basic dispersant may contain only one type, or may contain two or more types, of the basic group.

Acidic dispersants are dispersants having an acidic group without having a basic group. Examples of the acidic group include a carboxyl group (—COOH) and a sulfo group. The acidic dispersant may contain only one type, or may contain two or more types, of the acidic group.

The basic dispersant may further have an acidic group. The basic dispersant may be a basic dispersant which does not having an acidic group.

The ionic dispersant preferably dissolves in the non-aqueous solvent contained in the ink, and specifically, when equal volumes of the ionic dispersant and the non-aqueous solvent contained in the ink are mixed together at 1 atmosphere and 20° C., the two substances preferably dissolve uniformly without separating into two phases.

Examples of the basic dispersant include linear or branched dispersants having a basic group at a terminal of the main chain, basic dispersants that are polymers having a basic group and having a plurality of side chains (hereafter sometimes referred to as "basic dispersants having a comb-like structure" or "basic comb-like dispersants"), and basic dispersants that are basic (meth)acrylic resins (hereafter sometimes referred to as "basic (meth)acrylic-based dispersants").

From the viewpoint of improving the storage stability by improving the dispersion stability, the basic dispersant preferably contains a basic dispersant that is a polymer having a basic group and a plurality of side chains (a basic comb-like dispersant). The basic comb-like dispersant has a comb-like structure composed of a main chain and a plurality of side chains. The basic comb-like dispersant preferably has a side chain that contains a polyester portion, and more preferably has a plurality of side chains that contain a polyester portion.

In those cases where the basic comb-like dispersant has a side chain that contains a polyester portion, examples of the polyester portion of the side chain include structures derived from a hydroxycarboxylic acid or from a mixture of a hydroxycarboxylic acid and a carboxylic acid that does not have a hydroxyl group, and polymers having a carbonyl-C3 to C6-alkyleneoxy group as a unit. The basic comb-like dispersant preferably has a plurality of side chains containing such a polyester portion. Examples of structures derived from a mixture of a hydroxycarboxylic acid and a carboxylic acid that does not have a hydroxyl group include a carbonyl-C17-alkyleneoxy group derived from the self-condensation product of 12-hydroxystearic acid. Examples of the carbonyl-C3 to C6-alkyleneoxy group include a carbonyl-C5-alkyleneoxy group, and for example, a polymer containing a carbonyl-C5-alkyleneoxy group as a unit can be obtained by ring-opening polymerization of ε-caprolactone.

There are no particular limitations on the degree of polymerization of the polyester portion, and for example, the degree of polymerization of the polyester portion may be, for example, about 2 to about 80.

The basic comb-like dispersant may contain a basic group within the main chain skeleton, for example in the form of a polyamine skeleton or the like, and/or may contain a basic group that is bonded to the main chain either directly or via a linking group.

In those cases where the basic comb-like dispersant includes a basic group that is bonded to the main chain either directly or via a linking group, the basic comb-like dispersant may have one or more basic groups, but preferably has two or more basic groups. There are no particular limitations on the type of basic group that is bonded to the main chain either directly or via a linking group, and examples include the basic groups described above. Of these groups, an amino group or a morpholino group is preferred, and an amino group is more preferred.

Examples of the basic comb-like dispersant include basic dispersants that are polymers having a main chain that contains a polyamine skeleton and having a plurality of side chains (hereafter sometimes referred to as a "basic comb-like dispersant a"), and basic dispersants that are polymers having a basic group bonded to the main chain either directly or via a linking group, and having a plurality of side chains (hereafter sometimes referred to as a "basic comb-like dispersant b").

The polymer having a main chain that contains a polyamine skeleton and having a plurality of side chains (the basic comb-like dispersant a) is described.

In the basic comb-like dispersant a, examples of the main chain polyamine skeleton include polyalkyleneimine skeletons. Examples of the polyalkyleneimine of the polyalkyleneimine skeleton include polymers obtained by polymerizing one type, or two or more types of alkyleneimines of 2 to 8 carbon atoms, preferably alkyleneimines of 2 to 4 carbon atoms, by a typical method, and chemically modified polymers obtained by reacting any of these polymers with any of various compounds. Examples of the alkyleneimine of 2 to 8 carbon atoms include ethyleneimine, propyleneimine, butyleneimine, dimethylethyleneimine, pentyleneimine, hexyleneimine, heptyleneimine and octyleneimine.

The basic comb-like dispersant a preferably has a side chain that contains a polyester portion, and more preferably has a plurality of side chains that contain a polyester portion.

Examples of the basic comb-like dispersant a include graft polymers including the main chain that includes a polyamine skeleton such as a polyalkyleneimine skeleton, and graft chains that contain a polyester chain. There are no particular limitations on the weight average molecular weight of the polymer containing the polyamine skeleton that represents the main chain, but the weight average molecular weight is preferably not more than 600,000.

The basic comb-like dispersant a preferably has a side chain bonded via an amide linkage to a nitrogen atom of the polyamine skeleton of the main chain. For example, a side chain containing a polyester portion is preferably bonded via an amide linkage to a nitrogen atom of the polyamine skeleton of the main chain.

There are no particular limitations on the method used for producing the basic comb-like dispersant a. A basic comb-like dispersant containing a main chain that includes a polyamine skeleton such as a polyalkyleneimine skeleton and side chains containing a polyester portion can be obtained, for example, by a method that includes reacting a polyamine such as a polyalkyleneimine with a polyester having a free carboxyl group.

The basic comb-like dispersant a has a polyamine skeleton, but may also have one or more other basic groups, and for example may have a basic group bonded to the main chain either directly or via a linking group.

The basic dispersant that is a polymer having a basic group bonded to the main chain either directly or via a linking group, and having a plurality of side chains (the basic comb-like dispersant b) is described.

The basic comb-like dispersant b preferably has a side chain containing, for example, a polyester portion, and more preferably has a plurality of side chains containing a polyester portion.

The basic comb-like dispersant b may have one or more basic groups bonded to the main chain either directly or via a linking group, and preferably has two or more basic groups bonded to the main chain either directly or via a linking group. There are no particular limitations on the type of basic group, and examples include the basic groups described above. Of these groups, an amino group or a morpholino group is preferred, and an amino group is more preferred. The basic comb-like dispersant b may contain only one type, or may contain a plurality of types, of the basic group.

Examples of the basic comb-like dispersant b include copolymers containing a unit having a basic group bonded to the main chain either directly or via a linking group (hereafter sometimes referred to as "unit Xa") and a unit having a side chain containing a polyester portion (hereafter sometimes referred to as "unit Xb").

In the unit Xa, there are no particular limitations on the basic group, and the types of basic groups described above may be used, and among these, an amino group, an amide group or a morpholino group is preferred, and an amino group is more preferred.

For example, the unit Xa may be an acrylic unit or a methacrylic unit.

Examples of the unit Xa include units in which a carbonyl group is bonded to a carbon atom of the main chain, and a basic group is bonded to this carbonyl group, either directly or via a linking group. Examples of this type of unit include units derived from monomers containing an acryloyl group or a methacryloyl group and a basic group. The basic group is preferably bonded to the carbon atom of the carbonyl (CO) of the acryloyl group or methacryloyl group, either directly or via a linking group.

Examples of monomers containing an acryloyl group or a methacryloyl group and a basic group include (meth)acrylates having a basic group, (meth)acrylamides having a basic group, and (meth)acryloylmorpholine and the like. Specific examples of monomers containing an acryloyl group or a methacryloyl group and a basic group include dimethylaminoethyl (meth)acrylate, diethylaminoethyl (meth)acrylate, (meth)acryloylmorpholine, dimethyl (meth)acrylamide, and dimethylaminopropyl (meth)acrylamide.

The unit Xa may be a unit derived from a monomer obtained by adding an amine compound to a monomer having an epoxy group. The monomer having an epoxy group is preferably a monomer having an acryloyl group or a methacryloyl group and an epoxy group. Examples of the aforementioned monomer containing an acryloyl group or a methacryloyl group and a basic group also include monomers obtained by adding an amine compound to a monomer having an acryloyl group or a methacryloyl group and an epoxy group.

In the monomer having an acryloyl group or a methacryloyl group and an epoxy group, the epoxy group is preferably bonded to the carbon atom of the carbonyl (CO) of the acryloyl group or methacryloyl group, either directly or via a linking group. Specific examples of the monomer having an acryloyl group or a methacryloyl group and an epoxy group include glycidyl (meth)acrylate, 4-hydroxybutyl (meth)acrylate glycidyl ether, and 3,4-epoxycyclohexylmethyl (meth)acrylate.

The amine compound that is added to the monomer having an epoxy group is preferably an amine compound having a hydroxyl group (such as an alkanolamine). Specific examples of amine compounds having a hydroxyl group include benzylethanolamine, monoethanolamine and diethanolamine, and diethanolamine is particularly preferred.

Examples of the monomer obtained by adding an amine compound to a monomer having an acryloyl group or a methacryloyl group and an epoxy group include a diethanolamine adduct of glycidyl(meth)acrylate, and a benzylethanolamine adduct of glycidyl (meth)acrylate.

The unit derived from a monomer obtained by adding an amine compound to a monomer having an epoxy group may also be obtained, for example, by adding an amine compound to a unit derived from a monomer having an epoxy group, and a unit obtained in this manner may be used as the unit derived from a monomer obtained by adding an amine compound to a monomer having an epoxy group.

The unit having a side chain containing a polyester portion (the unit Xb) may, for example, be an acrylic unit or a methacrylic unit.

Examples of the unit Xb include units in which a carbonyl group is bonded to a carbon atom of the main chain, and a polyester portion is bonded to this carbonyl group, either directly or via a linking group. Examples of this type of unit include units derived from monomers containing an acryloyl group or a methacryloyl group and a polyester portion. The polyester portion is preferably bonded to the carbon atom of the carbonyl (CO) of the acryloyl group or methacryloyl group, either directly or via a linking group.

The monomer containing an acryloyl group or a methacryloyl group and a polyester portion can be obtained, for example, by reacting a monomer having an acryloyl group or a methacryloyl group and an epoxy group with a hydroxycarboxylic acid condensate or the like. Examples of the monomer having an acryloyl group or a methacryloyl group and an epoxy group include the monomers having an acryloyl group or a methacryloyl group and an epoxy group described above. Examples of hydroxycarboxylic acid condensates that may be used include 12-hydroxystearic acid 6-condensate and the like. The reaction may, for example, use a catalyst such as tetrabutylammonium bromide and/or a polymerization inhibitor such as aluminum N-nitrosophenylhydroxylamine.

The basic comb-like dispersant b may also contain one or more other units. Examples of these other units include units having an alkyl group of 1 to 8 carbon atoms (hereafter sometimes referred to as "unit Xc"). The alkyl group of 1 to 8 carbon atoms is more preferably an alkyl group of 1 to 4 carbon atoms. Examples of the alkyl group of 1 to 8 carbon atoms include a methyl group, ethyl group, butyl group and 2-ethylhexyl group.

For example, the unit having an alkyl group of 1 to 8 carbon atoms (the unit Xc) may be an acrylic unit or a methacrylic unit.

Examples of the unit Xc include units in which a group represented by —COOR$^d$ is bonded to a carbon atom of the main chain of a (meth)acrylic resin, wherein R$^d$ is an alkyl group of 1 to 8 carbon atoms (and preferably 1 to 4 carbon atoms).

For example, units derived from a monomer Xc described below may be used as the unit Xc.

The basic comb-like dispersant b may contain only one type, or may contain two or more types, of the unit Xa. Similarly, the basic comb-like dispersant b may contain only one type, or may contain two or more types, of the unit Xb. Further, in those cases where the basic comb-like dispersant contains the unit Xc, either one type, or two or more types, of the unit Xc may be included.

The amount of the unit Xa, relative to the total mass of the polymer, is preferably from 1 to 50% by mass, more preferably from 2 to 40% by mass, and even more preferably from 2 to 30% by mass.

The amount of the unit Xb, relative to the total mass of the polymer, is preferably from 10 to 95% by mass, more preferably from 20 to 90% by mass, and even more preferably from 40 to 85% by mass.

When the unit Xc is included, the amount of the unit Xc, relative to the total mass of the polymer, is preferably from 1 to 90% by mass, more preferably from 5 to 50% by mass, and even more preferably from 5 to 30% by mass.

Here, the total mass of the polymer is based on the combined mass of all of the units that constitute the basic comb-like dispersant b.

The basic comb-like dispersant b can be obtained, for example, by polymerizing a monomer mixture containing a monomer having a basic group (hereafter sometimes referred to as "monomer Xa") and a monomer having a side chain containing a polyester portion (hereafter sometimes referred to as "monomer Xb").

Examples of the monomer having a basic group (the monomer Xa) include the aforementioned monomers containing an acryloyl group or a methacryloyl group and a basic group. Examples of the monomer having a side chain containing a polyester portion (the monomer Xb) include the aforementioned monomers containing an acryloyl group or a methacryloyl group and a polyester portion.

The monomer mixture may contain, in addition to the monomer having a basic group (the monomer Xa), or instead of the monomer Xa, an aforementioned monomer having an epoxy group (such as a monomer having an acryloyl group or a methacryloyl group and an epoxy group). In this case, for example, following polymerization of the monomer mixture, a unit having a basic group (the unit Xa) may be obtained by reacting an amine compound with the structure derived from the monomer having an epoxy group.

The monomer mixture may also contain one or more other monomers, and examples of these other monomers include monomers having an alkyl group of 1 to 8 carbon atoms (hereafter sometimes referred to as "monomer Xc"). The monomer having an alkyl group of 1 to 8 carbon atoms (the monomer Xc) is preferably a monomer having an acryloyl group or a methacryloyl group and an alkyl group of 1 to 8 carbon atoms. Preferred examples of the monomer Xc include alkyl (meth)acrylates having an alkyl group of 1 to 8 carbon atoms. Specific examples of the monomer Xc include methyl (meth)acrylate, ethyl (meth)acrylate, butyl (meth)acrylate and 2-ethylhexyl (meth)acrylate.

The blend amount of each monomer in the monomer mixture may be adjusted so as to achieve the desired proportion for each of the units described above. The monomer mixture may be polymerized by conventional radical copolymerization. Examples of polymerization methods that may be used include the methods described above as the synthesis method for the (meth)acrylic resin that may be included in the colored resin particles.

The weight average molecular weight of the basic comb-like dispersant b is preferably from 5,000 to 50,000, and more preferably from 10,000 to 30,000.

From the viewpoint of reducing the ink viscosity, the basic dispersant preferably contains a dispersant that is a basic (meth)acrylic resin (namely, a basic (meth)acrylic-based dispersant). A basic (meth)acrylic resin is a (meth) acrylic resin that has a basic group.

The basic (meth)acrylic-based dispersant contains a basic group. The basic (meth)acrylic-based dispersant preferably also has a β-dicarbonyl group and/or an alkyl group. For example, from the viewpoint of reducing the ink viscosity, the basic dispersant preferably contains a basic (meth) acrylic-based dispersant having a basic group, a β-dicarbonyl group and an alkyl group. Two or three of the basic group, the β-dicarbonyl group and the alkyl group may be included in the same unit, but it is preferable that the basic group, the β-dicarbonyl group and the alkyl group are included in mutually different units. Examples of this type of basic (meth)acrylic-based dispersant include basic (meth) acrylic-based dispersants containing a unit having a basic group (hereafter sometimes referred to as "unit Ya"), a unit having a β-dicarbonyl group (hereafter sometimes referred to as "unit Yb"), and a unit having an alkyl group (hereafter sometimes referred to as "unit Yc").

Examples of the basic (meth)acrylic-based dispersant include copolymers of a monomer mixture containing a monomer having a basic group (hereafter sometimes referred to as "monomer Ya"), a monomer having a β-dicarbonyl group (hereafter sometimes referred to as "monomer Yb") and a monomer having an alkyl group (hereafter sometimes referred to as "monomer Yc"), and copolymers obtained using such copolymers.

It is thought that when a basic (meth)acrylic-based dispersant having a basic group, a β-dicarbonyl group and an alkyl group is used, the adsorption to the colored resin particles may be further improved, the amount of free dispersant in the non-aqueous solvent may be reduced, and the ink viscosity may be further reduced.

Further, it is thought that by reducing the amount of free dispersant, any deterioration in the interactions between the colored resin particles and the polar groups of the recording medium caused as a result of interactions between the free dispersant and the polar groups of the recording medium can be suppressed, meaning the colored resin particles can be more readily retained on the surface of the recording medium, which tends to contribute to improved image density and reduced strike-through.

There are no particular limitations on the basic group, and for example the basic groups described above may be used, and of these, an amino group, an amide group or a morpholino group is preferred, and an amino group is more preferred. The basic (meth)acrylic-based dispersant may have only one type, or may have two or more types, of the basic group. The basic group is preferably bonded to the main chain either directly or via a linking group.

As the unit having a basic group (the unit Ya), for example, any of the units described above for the unit Xa may be used. The basic (meth)acrylic-based dispersant may have only one type, or may have two or more types, of the unit Ya.

The alkyl group is preferably an alkyl group of 8 to 22 carbon atoms, and more preferably an alkyl group of 12 to 22 carbon atoms. The alkyl group of 8 to 22 carbon atoms may be linear or branched. Specific examples include an octyl group, nonyl group, decyl group, undecyl group, dodecyl group, tridecyl group, tetradecyl group, pentadecyl group, hexadecyl group, heptadecyl group, octadecyl group, nonadecyl group, eicosyl group and docosyl group. The basic (meth)acrylic-based dispersant may contain only one type, or may contain a plurality of types, of these alkyl groups.

For example, the unit having an alkyl group (the unit Yc) may be an acrylic unit or a methacrylic unit.

Examples of the unit Yc include units in which a group represented by —COOR$^f$ is bonded to a carbon atom of the main chain of the basic (meth)acrylic-based dispersant, wherein R$^f$ is an alkyl group (preferably an alkyl group of 8 to 22 carbon atoms, and more preferably 12 to 22 carbon atoms).

For example, a unit derived from a monomer Yc described below may be used as the unit Yc.

The basic (meth)acrylic-based dispersant may contain only one type, or may contain two or more types, of the unit Yc.

Examples of the β-dicarbonyl group include β-diketone groups such as an acetoacetyl group and a propionacetyl group, and β-keto acid ester groups such as an acetoacetoxy group and a propionacetoxy group. The basic (meth)acrylic-based dispersant may contain only one type, or may contain a plurality of types, of these β-dicarbonyl groups.

For example, the unit having the β-dicarbonyl group (the unit Yb) may be an acrylic unit or a methacrylic unit.

Examples of the unit Yb include units in which a carbonyl group is bonded to a carbon atom of the main chain, and a β-dicarbonyl group is then bonded to the carbon atom of that carbonyl group, either directly or via a linking group.

The unit Yb is preferably a unit derived from a (meth) acrylate having a β-dicarbonyl group, or a unit derived from a (meth)acrylamide having a β-dicarbonyl group or the like. Preferred examples of (meth)acrylates having a β-dicarbonyl group include (meth)acrylates having a β-diketone group or β-keto acid ester group bonded indirectly to the carbon atom of the carbonyl (CO) of an acryloyl group or methacryloyl group. Preferred examples of (meth)acrylamides having a β-dicarbonyl group include (meth)acrylamides having a β-diketone group or β-keto acid ester group bonded indirectly to the carbon atom of the carbonyl (CO) of an acryloyl group or methacryloyl group. For example, units derived from a monomer Yb described below may be used as the unit b.

The basic (meth)acrylic-based dispersant may contain only one type, or may contain two or more types, of the unit Yb.

The basic (meth)acrylic-based dispersant may also contain one or more other units.

The amount of the unit having a basic group (the unit Ya), relative to the total mass of the polymer, is preferably from 5 to 30% by mass, and more preferably from 10 to 20% by mass.

The amount of the unit having an alkyl group (the unit Yc), relative to the total mass of the polymer, is preferably from 40 to 90% by mass, more preferably from 50 to 90% by mass, and even more preferably from 60 to 80% by mass.

The amount of the unit having a β-dicarbonyl group (the unit Yb), relative to the total mass of the polymer, is preferably from 5 to 30% by mass, and more preferably from 10 to 20% by mass.

Here, the total mass of the polymer is based on the combined mass of all of the units that constitute the basic (meth)acrylic-based dispersant.

The basic (meth)acrylic-based dispersant can be obtained, for example, by polymerizing a monomer mixture containing a monomer having a basic group (the monomer Ya), a monomer having a β-dicarbonyl group (the monomer Yb), and a monomer having an alkyl group (the monomer Yc).

Examples of the monomer Ya include the same monomers as those described above for the monomer Xa.

The monomer Yc is, for example, preferably a monomer having an acryloyl group or a methacryloyl group and an alkyl group. Examples of the monomer Yc include alkyl (meth)acrylates, wherein alkyl (meth)acrylates having an alkyl group of 8 to 22 carbon atoms are preferred, and alkyl (meth)acrylates having an alkyl group of 12 to 22 carbon atoms are more preferred. Specific examples of the monomer Yc include behenyl (meth)acrylate and lauryl (meth)acrylate.

The monomer Yb is, for example, preferably a monomer having an acryloyl group or a methacryloyl group and a β-dicarbonyl group. Preferred examples of the monomer Yb include (meth)acrylates having a β-dicarbonyl group and (meth)acrylamides having a β-dicarbonyl group. Specific examples of the monomer Yb include acetoacetoxyalkyl (meth)acrylates such as acetoacetoxyethyl (meth)acrylate, hexadione (meth)acrylate, and acetoacetoxyalkyl (meth) acrylamides such as acetoacetoxyethyl (meth)acrylamide.

The monomer mixture may also contain one or more other monomers.

For example, the monomer mixture may contain, in addition to the monomer having a basic group (the monomer Ya), or instead of the monomer Ya, an aforementioned monomer having an epoxy group (such as a monomer having an acryloyl group or a methacryloyl group and an epoxy group). In this case, for example, following polymerization of the monomer mixture, a unit having a basic group (the unit Ya) may be obtained by reacting an amine compound, described above as an amine compound that can be added to a monomer having an epoxy group, with the structure derived from the monomer having an epoxy group.

The blend amount of each monomer in the monomer mixture may be adjusted so as to achieve the desired proportion for each of the units described above. The monomer mixture may be polymerized by conventional radical copolymerization. Examples of polymerization methods that may be used include the methods described above as the synthesis method for the (meth)acrylic resin that may be included in the colored resin particles.

There are no particular limitations on the weight average molecular weight of the basic (meth)acrylic-based dispersant, but from the viewpoints of the ink stability and the ink viscosity, the weight average molecular weight is preferably from 5,000 to 30,000.

Examples of commercially available basic dispersants include Solsperse 17000, Solsperse 16000 and Solsperse 13940 manufactured by The Lubrizol Corporation, and Hypermer KD11 manufactured by Croda International Plc. Among these, examples of commercially available products of the basic comb-like dispersant include Solsperse 13940 and Hypermer KD11.

Examples of commercially available acidic dispersants include Solsperse 21000 manufactured by The Lubrizol Corporation.

The ink may contain only one type of ionic dispersant, or may contain a combination of two or more types of ionic dispersant. For example, a single basic dispersant may be used, or a combination of two or more basic dispersants may be used.

From the viewpoints of the image density and the storage stability, the use of a combination of a basic comb-like dispersant and a basic (meth)acrylic-based dispersant is preferred.

The amount of the ionic dispersant may be adjusted as appropriate. The amount of the ionic dispersant, relative to the total mass of the ink, is preferably at least 0.1% by mass, more preferably at least 1% by mass, and even more preferably 2% by mass or greater. On the other hand, the amount of the ionic dispersant, relative to the total mass of the ink, is preferably not more than 10% by mass, and more preferably 5% by mass or less. For example, the amount of the ionic dispersant relative to the total mass of the ink is preferably from 0.1 to 10% by mass, more preferably from 1 to 10% by mass, and even more preferably from 2 to 5% by mass.

When a basic dispersant is included, the amount of the basic dispersant, relative to the total mass of the ionic dispersant, is preferably from 50 to 100% by mass, and more preferably from 70 to 100% by mass. The amount of the basic dispersant, relative to the total mass of the ink, is preferably from 0.1 to 10% by mass, more preferably from 1 to 10% by mass, and even more preferably from 2 to 5% by mass.

Examples of the non-aqueous solvents include non-polar organic solvents and polar organic solvents. These solvents may be used individually, or combinations of two or more solvents may be used, provided the solvents form a single phase. In an embodiment of the present invention, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents, examples of which include aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of preferred polar organic solvents include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate; higher alcohol-based solvents having at least 6 carbon atoms, and preferably 12 to 20 carbon atoms, within one molecule, such as isomyristyl alcohol, isopalmityl alcohol, stearyl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

When a solvent having a high boiling point or initial boiling point is used, drying of the ink on the nozzles of the inkjet head tends to be more easily prevented; however, for example, strike-through in the printed items due to show-through caused by the solvent, an increase in the ink viscosity and/or the like may sometimes also occur. The solvent, or an appropriate combination of a plurality of solvents, is preferably selected with due consideration of the balance between the drying properties of the ink on the nozzles, strike-through in the printed items, and the ink viscosity.

In addition to the components described above, the oil-based ink may also contain any of various types of additives. For example, any one or more of a nozzle blockage prevention agent, an antioxidants, a conductivity adjuster, a viscosity adjuster, a surface tension adjuster, and oxygen absorber and the like may be added as additives. There are no particular limitations on the types of additives that may be used, and any additives typically used in the technical field may be used.

The amount of water in the ink, relative to the total mass of the ink, is preferably not more than 1% by mass, more preferably less than 1% by mass, even more preferably not more than 0.5% by mass, and still more preferably 0.1% by mass or less.

The average particle size of the colored resin particles in the ink is preferably from 50 to 300 nm, and more preferably from 80 to 200 nm. The amount of colored resin particles in the ink, expressed as an amount of the solid fraction of the colored resin particles relative to the total mass of the ink, is preferably from 1 to 40% by mass, and more preferably from 5 to 30% by mass. The average particle size of the colored resin particles represents the volume-based average particle size determined by a dynamic scattering method, and can be measured, for example, using a dynamic light scattering particle size distribution analyzer LB-500 manufactured by Horiba, Ltd.

The suitable range for the viscosity of the oil-based inkjet ink varies depending on factors such as the diameter of the nozzles in the discharge head in the inkjet recording system and the discharge environment, but generally, the viscosity at 23° C. is preferably within a range from 5 to 30 mPa·s, more preferably from 5 to 15 mPa·s, and even more preferably about 10 mPa·s.

There are no particular limitations on the method for producing the oil-based inkjet ink described above.

Methods for producing an oil-based inkjet ink containing colored resin particles may be broadly classified into methods that employ chemical techniques and methods that employ physicochemical techniques. Examples of the chemical techniques include interfacial polycondensation methods, interfacial reaction methods (in situ polymerization methods), and in-liquid cured coating methods (orifice methods). Examples of the physicochemical techniques include in-liquid drying methods (in-water drying methods and in-oil drying methods), coacervation methods, and fusion dispersion cooling methods.

In-liquid drying methods can be used favorably for producing the oil-based inkjet ink described above, and in-oil drying of a water-in-oil (W/O) emulsion can be used particularly favorably.

One example of a method for producing an oil-based inkjet ink using in-oil drying of a water-in-oil emulsion includes producing a water-in-oil emulsion containing a continuous phase containing a non-aqueous solvent and an ionic dispersant, and a dispersed phase containing water, a colorant and a water-dispersible urethane-urea resin (hereafter sometimes referred to as "step 1"), and removing the water from the water-in-oil emulsion (hereafter sometimes referred to as "step 2").

In this method, it is thought that the ionic dispersant may function as a lipophilic emulsifier.

Methods that employ in-oil drying of a water-in-oil emulsion do not require the use of volatile organic solvents, and therefore offer excellent safety.

When the above method that employs in-oil drying of a water-in-oil emulsion is used, an ink of low viscosity may be produced. It is thought that this is because this method may enable the production of an ink containing colored resin particles for which the average particle size is small and the particle size distribution is narrow.

As the non-aqueous solvent, the ionic dispersant and the colorant in this method, the non-aqueous solvent, the ionic dispersant and the colorant described above as ink components may be respectively used. As the water-dispersible urethane-urea resin, a water-dispersible resin selected from among the urethane-urea resins described above as ink components may be used, and, among them, for example, a water-dispersible urethane-urea resin having an acidic group may be more preferably used.

As the water, for example, tap water, ion-exchanged water, deionized water, purified water or the like may be used.

In the water-in-oil emulsion produced in step 1, the continuous phase and the dispersed phase may each contain one or more other components. For example, the dispersed phase may also contain a (meth)acrylic resin and/or a pigment dispersant or the like. Examples of the pigment dispersant include the same materials as those described above in relation to components that may be included in the colored resin particles in the aforementioned ink, and of these, the water-soluble nonionic dispersants described above are more preferred. As the (meth)acrylic resin, a water-dispersible resin selected from among the (meth) acrylic resins described above as components that may be included in the colored resin particles in the aforementioned ink may be used, and, among them, for example, a water-dispersible (meth)acrylic resin having an acidic group may be more preferably used.

The amount of the colorant, relative to the total mass of the dispersed phase, is preferably from 1 to 50% by mass, and more preferably from 5 to 40% by mass. The amount of the colorant relative to the total mass of the water-in-oil emulsion is preferably from 1 to 30% by mass, and more preferably from 2 to 20% by mass.

The amount of the water-dispersible urethane-urea resin, relative to the total mass of the dispersed phase, is preferably from 0.1 to 40% by mass, and more preferably from 1 to 30% by mass. The amount of the water-dispersible urethane-urea resin relative to the total mass of the water-in-oil emulsion is preferably from 0.1 to 20% by mass, and more preferably from 1 to 15% by mass.

The amount of water, relative to the total mass of the dispersed phase, is preferably from 40 to 90% by mass, and more preferably from 50 to 80% by mass. The amount of water relative to the total mass of the water-in-oil emulsion is preferably from 1 to 50% by mass, more preferably from 5 to 50% by mass, and even more preferably from 10 to 40% by mass.

In the water-in-oil emulsion produced in step 1, when a pigment dispersant is included, the amount of the pigment dispersant relative to the total mass of the dispersed phase is preferably from 0.1 to 20% by mass, and more preferably from 1 to 10% by mass. The amount of the pigment dispersant relative to the total mass of the water-in-oil emulsion is preferably from 0.1 to 10% by mass, and more preferably from 0.5 to 5% by mass. When a water-soluble nonionic dispersant is included, the amount of the water-soluble nonionic dispersant relative to the total mass of all pigment dispersants is preferably from 50 to 100% by mass, and more preferably from 70 to 100% by mass.

The amount of the ionic dispersant, relative to the total mass of the continuous phase, is preferably from 0.1 to 10% by mass, and more preferably from 0.2 to 5% by mass. The amount of the ionic dispersant relative to the total mass of the water-in-oil emulsion is preferably from 0.1 to 10% by mass, and more preferably from 0.5 to 5% by mass.

The amount of the non-aqueous solvent, relative to the total mass of the continuous phase, is preferably from 70 to 99% by mass, and more preferably from 80 to 99% by mass. The amount of the non-aqueous solvent relative to the total mass of the water-in-oil emulsion is preferably from 30 to 80% by mass, and more preferably from 40 to 70% by mass.

In step 1, the water-in-oil emulsion can be produced, for example, by mixing the aforementioned components of the dispersed phase and the aforementioned components of the continuous phase, and then emulsifying the mixture.

A mixture for the continuous phase containing the components of the continuous phase and a mixture for the dispersed phase containing the components of the dispersed phase are preferably prepared separately in advance. Subsequently, the mixture for the dispersed phase is preferably added to the mixture for the continuous phase and an emulsification treatment is performed. The emulsification treatment may be performed, for example, using an ultrasonic homogenizer or the like while the mixture for the dispersed phase is added to the mixture for the continuous phase, or the emulsification may be performed after addition of the mixture for the dispersed phase to the mixture for the continuous phase.

In step 1, the composition of the water-in-oil emulsion prior to removal of the water, expressed in terms of mass ratios, preferably contains 20 to 50% by mass of the dispersed phase and 80 to 50% by mass of the continuous phase, relative to the total mass of the water-in-oil emulsion.

In step 2, the water of the dispersed phase in the water-in-oil emulsion is removed. This may enable colored resin particles to be obtained which contain the dispersed phase components from which water has been removed.

Examples of methods that may be used for removing the water include methods for promoting evaporation, for example by applying reduced pressure and/or heating, or by bubbling a gas through the liquid, and methods that combine these methods. The reduced pressure and/or heating conditions employed are selected so that the water is removed, but the non-aqueous solvent of the continuous phase is retained. The reduced pressure method may, for example, use an evaporator. The heating temperature is preferably at least 30° C., more preferably from 40 to 100° C., and even more preferably from 60 to 90° C.

In step 2, the amount of water removed from the dispersed phase relative to the amount of water prior to removal is preferably at least 80% by mass, more preferably at least 90% by mass, even more preferably at least 95% by mass, and still more preferably 99% by mass or more.

There are no particular limitations on the printing method used with the oil-based inkjet ink, and any of various printing systems including a piezo system, electrostatic system or thermal system may be used. In those cases where an inkjet recording device is used, the ink of an embodiment of the present invention is preferably discharged from the inkjet head based on a digital signal, with the discharged ink droplets being adhered to a recording medium.

In embodiments of the present invention, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface.

Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail based on a series of examples. However, the present invention is not limited by the following examples.

In the following examples and comparative examples, unless specifically stated otherwise, common components refer to the same component. Further, unless specifically stated otherwise, "%" means "% by mass".

<Ink Materials>

The materials used in the inks of the examples and comparative examples are listed below.

Carbon black: MOGUL L (manufactured by Cabot Specialty Chemicals Inc.) (powder)

Phthalocyanine blue: LIONOL BGFJ (manufactured by Toyo Ink Mfg. Co., Ltd.) (powder)

Self-dispersing pigment: BONJET BLACK CW-1 (manufactured by Orient Chemical Industries, Ltd.) (a self-dispersing carbon black, water dispersion, solid fraction: 20%)

Pigment dispersant: Borchi Gen DFN (manufactured by Borchers GmbH) (a water-soluble non-ionic dispersant, an aryl alkyl biphenylol polyglycol ether, active component: 100%)

Acidic urethane-urea 1: WS5984 (manufactured by Mitsui Chemicals, Inc.) (a water dispersion of a urethane-urea resin having an acidic group, active component: 40%)

Acidic urethane-urea 2: SUPERFLEX 740 (manufactured by DKS Co., Ltd.) (a water dispersion of a urethane-urea resin having an acidic group active component: 40%)

Acidic urethane-urea 3: WS4022 (manufactured by Mitsui Chemicals, Inc.) (a water dispersion of a urethane-urea resin having an acidic group, active component: 30%)

Acidic urethane-urea 4: SUPERFLEX 150H (manufactured by DKS Co., Ltd.) (a water dispersion of a urethane-urea resin having an acidic group, active component: 38%)

Acidic urethane-urea 5: DAOTAN VTW1262 (manufactured by Daicel Allnex Ltd.) (a water dispersion of a hybrid urethane-urea and acrylic resin having an acidic group, active component: 35%)

Basic urethane-urea 1: SUPERFLEX 620 (manufactured by DKS Co., Ltd.) (a water dispersion of a urethane-urea resin having a basic group, active component: 30%)

Nonionic urethane-urea 1: SUPERFLEX 500M (manufactured by DKS Co., Ltd.) (a water dispersion of a urethane-urea resin, nonionic, active component: 45%)

(Meth)acrylic resin 1: synthesized using the method described below (a water dispersion of a (meth)acrylic resin having an acidic group, active component: 20%)

Urethane resin c1: synthesized using the method described below (a urethane resin solution, active component: 50%, solvent: methyl ethyl ketone)

Urethane resin c2: synthesized using the method described below (a urethane resin solution, active component: 50%, solvent: methyl ethyl ketone)

Basic dispersant 1: Solsperse 17000 (manufactured by The Lubrizol Corporation) (active component: 100%)

Basic dispersant 2: Solsperse 16000 (manufactured by The Lubrizol Corporation) (active component: 100%)

Basic comb-like dispersant 1: Hypermer KD11 manufactured by Croda International Plc) (a solution of a basic comb-like dispersant, active component: 40%, solvent: high-boiling point paraffin oil)

Basic comb-like dispersant 2: Solsperse 13940 (manufactured by The Lubrizol Corporation) (a solution of a basic comb-like dispersant, active component: 40%, solvent: petroleum-based solvent)

Basic comb-like dispersant 3: synthesized using the method described below (a solution of a basic comb-like dispersant b, active component: 40%, solvent: an ester-based solvent)

Basic comb-like dispersant 4: synthesized using the method described below (a solution of a basic comb-like dispersant b, active component: 40%, solvent: an ester-based solvent)

Basic comb-like dispersant 5: synthesized using the method described below (a solution of a basic comb-like dispersant b, active component: 40%, solvent: an ester-based solvent)

Basic comb-like dispersant 6: synthesized using the method described below (a solution of a basic comb-like dispersant b, active component: 40%, solvent: an ester-based solvent)

Basic comb-like dispersant 7: synthesized using the method described below (a solution of a basic comb-like dispersant b, active component: 40%, solvent: an ester-based solvent)

(Meth)acrylic-based dispersant 1: synthesized using the method described below (a solution of a basic (meth)acrylic-based dispersant, active component: 40%, solvent: an ester-based solvent)

(Meth)acrylic-based dispersant 2: synthesized using the method described below (a solution of a basic (meth)acrylic-based dispersant, active component: 40%, solvent: an ester-based solvent)

(Meth)acrylic-based dispersant 3: synthesized using the method described below (a solution of a basic (meth)acrylic-based dispersant, active component: 40%, solvent: an ester-based solvent)

(Meth)acrylic-based dispersant 4: synthesized using the method described below (a solution of a basic (meth)acrylic-based dispersant, active component: 40%, solvent: an ester-based solvent)

(Meth)acrylic-based dispersant 5: synthesized using the method described below (a solution of a (meth)acrylic-based dispersant, active component: 40%, solvent: an ester-based solvent)

(Meth)acrylic-based dispersant 6: synthesized using the method described below (a solution of a basic (meth)acrylic-based dispersant, active component: 40%, solvent: an ester-based solvent)

Acidic dispersant 1: Solsperse 21000 (manufactured by The Lubrizol Corporation) (active component: 100%)

Fatty acid ester-based solvent 1: methyl oleate (manufactured by FUJIFILM Wako Pure Chemical Corporation)

Fatty acid ester-based solvent 2: isopropyl myristate (manufactured by FUJIFILM Wako Pure Chemical Corporation)

Petroleum-based hydrocarbon solvent 1: Exxsol D110 (manufactured by Exxon Mobil Corporation)

Petroleum-based hydrocarbon solvent 2: Exxsol D130 (manufactured by Exxon Mobil Corporation)

<Synthesis of (Meth)Acrylic Resin 1>

A series of monomers (benzyl methacrylate, acetoacetoxyethyl methacrylate, hydroxyethyl methacrylate, methyl methacrylate and methacrylic acid) were mixed in the proportions shown in Table 1 to obtain a monomer mixture.

A four-neck flask was charged with a mixed solvent of methyl ethyl ketone and ethanol, and the temperature was raised to 60° C. under stirring while the flask was flushed with nitrogen gas. Once the liquid temperature had stabilized at 60° C., V-65 was added, and the monomer mixture obtained above was then added dropwise to the mixed solvent over a period of three hours. Following completion of the dropwise addition of the monomer mixture, V-70 was added to the reaction mixture in two portions, two hours after and then four hours after completion of the dropwise addition.

Subsequently, the liquid temperature was maintained at 60° C. for two hours, and the reaction mixture was then cooled to obtain a solution of a (meth)acrylic resin 1 having a solid fraction of 35%. The acid value of the obtained resin was measured in accordance with JIS K 2501. The result is shown in Table 1.

Subsequently, 54.86 parts by mass of the obtained resin solution with a solid fraction of 35%, 26.05 parts by mass of methyl ethyl ketone, 26.05 parts by mass of ethanol, 8 parts by mass of an aqueous solution (10%) of sodium hydroxide and 72.8 parts by mass of purified water were mixed together, and with the mixture undergoing constant stirring with a magnetic stirrer, a dispersion was performed under ice cooling by irradiating the mixture for 10 minutes using an ultrasonic homogenizer "Ultrasonic Processor VC-750" (manufactured by Sonics & Materials, Inc.). Following dispersion, the low-boiling point solvents (ethanol and methyl ethyl ketone) were removed from the dispersion using an evaporator under reduced pressure, yielding a water dispersion of the (meth)acrylic resin (active component: 20%).

TABLE 1

|  | Parts by mass |
| --- | --- |
| Benzyl methacrylate | 20 |
| Acetoacetoxyethyl methacrylate | 20 |
| Hydroxyethyl methacrylate | 10 |
| Methyl methacrylate | 40 |
| Methacrylic acid | 10 |
| Methyl ethyl ketone | 35.44 |
| Ethanol | 153.39 |

TABLE 1-continued

|  | Parts by mass |
| --- | --- |
| V-65 | 1 |
| V-70 | 0.66 |
| Total (parts by mass) | 290.49 |
| Solid fraction (%) | 35 |
| Acid value (mgKOH/g, solid) | 65 |

The monomers, solvents and initiators shown in Table 1 are as follows.

Benzyl methacrylate: manufactured by FUJIFILM Wako Pure Chemical Corporation

Acetoacetoxyethyl methacrylate: manufactured by The Nippon Synthetic Chemical Industry Co., Ltd.

Hydroxyethyl methacrylate: manufactured by Uni-Chemical Co., Ltd.

Methyl methacrylate: manufactured by FUJIFILM Wako Pure Chemical Corporation

Methacrylic acid: manufactured by FUJIFILM Wako Pure Chemical Corporation

Methyl ethyl ketone: manufactured by FUJIFILM Wako Pure Chemical Corporation

Ethanol: manufactured by FUJIFILM Wako Pure Chemical Corporation

V-65: 2,2'-azobis(2,4-dimethylvaleronitrile) (a polymerization initiator), manufactured by FUJIFILM Wako Pure Chemical Corporation V-70: 2,2'-azobis(4-methoxy-2,4-dimethylvaleronitrile) (a polymerization initiator), manufactured by FUJIFILM Wako Pure Chemical Corporation <Synthesis of Urethane Resins c1 and c2>

Formulations of diols a and b are shown in Table 2. In each case, a flask was charged with the proportion of diethanolamine shown in Table 2, and the temperature was raised to 110° C. The monomer shown in the table in an amount shown in the table was then added dropwise to the flask, and a Michael addition reaction was completed to obtain the diol.

TABLE 2

| (% by mass) | Diol a | Diol b |
| --- | --- | --- |
| Diethanolamine | 45.2 | 17.9 |
| Diethyl acrylamide | 54.8 |  |
| Methoxy polyethylene glycol (PEG9) acrylate |  | 82.1 |
| Total (% by mass) | 100 | 100 |

Formulations of urethane resin solutions (urethane resins c1 and c2) used in Comparative Examples 1 to 3 are shown in Table 3. Using the blend amounts shown in Table 3, a flask was charged with one of the diol solutions obtained above, propylene glycol as another diol component, and MEK (methyl ethyl ketone), a tin-based catalyst (dibutyltin dilaurate) was added, and the temperature was raised to 78° C. The diisocyanate (hexamethylene diisocyanate) was then added dropwise to the flask, thus obtaining a resin solution (of the urethane resin c1 or c2) having a solid fraction of 50.0% by mass.

The weight average molecular weight (measured by a GPC method relative to standard polystyrenes) is also shown in the table.

TABLE 3

| (% by mass) | Urethane resin c1 | Urethane resin c2 |
|---|---|---|
| Diol a | 17.99 | |
| Diol b | | 29.33 |
| Hexamethylene diisocyanate | 26.06 | 16.8 |
| Propylene glycol | 5.89 | 3.8 |
| Tin-based catalyst (dibutyltin dilaurate) | 0.06 | 0.07 |
| MEK | 50 | 50 |
| Total (% by mass) | 100 | 100 |
| Solid fraction (% by mass) | 50 | 50 |
| Weight average molecular weight (Mw) | 9,000 | 8,000 |

The materials shown in Table 2 and Table 3 are as follows.

Diethanolamine: manufactured by Nippon Shokubai Co., Ltd.

Diethyl acrylamide: manufactured by KJ Chemicals Corporation

Methoxy polyethylene glycol (PEGS) acrylate: manufactured by NOF Corporation

Hexamethylene diisocyanate: manufactured by FUJIFILM Wako Pure Chemical Corporation Propylene glycol: manufactured by FUJIFILM Wako Pure Chemical Corporation Dibutyltin dilaurate: manufactured by Tokyo Fine Chemical Co., Ltd.

<Synthesis of Basic Comb-Like Dispersants 3 to 7>

The compounds shown in Table 4 were mixed together in the proportions shown in Table 4, and by stirring the mixture at 120° C. for 14 hours, a monomer (compound 1) was obtained that is to be used to form the unit having a side chain containing a polyester portion in the basic comb-like dispersants 3 to 7.

TABLE 4

| (compound 1) | (parts by mass) |
|---|---|
| PHF-33 | 200 |
| BLEMMER G | 18 |
| Tetrabutylammonium bromide | 0.2 |
| Q1301 | 0.2 |

The materials shown in Table 4 are as follows.

PHF-33: 12-hydroxystearic acid 6-condensate, manufactured by Itoh Oil Chemicals Co., Ltd.

BLEMMER G: glycidyl methacrylate, manufactured by NOF Corporation

Tetrabutylammonium bromide: manufactured by FUJIFILM Wako Pure Chemical Corporation Q1301: aluminum N-nitroso-phenylhydroxylamine (a polymerization inhibitor), manufactured by FUJIFILM Wako Pure Chemical Corporation The materials shown in Table 5 were mixed together in the proportions shown in Table 5, the inside of the flask was flushed with nitrogen gas, and the mixture was then stirred at 90° C. for 24 hours. In the synthesis of the basic comb-shaped dispersant 5, diethanolamine (manufactured by FUJIFILM Wako Pure Chemical Corporation) was then added in an amount of one equivalent relative to the glycidyl methacrylate, and the mixture was stirred at 110° C. for 3 hours. Solutions of the basic comb-like dispersants 3 to 7 (each having a solid fraction of 40%) were obtained.

TABLE 5

| (parts by mass) | Basic comb-like dispersant 3 | Basic comb-like dispersant 4 | Basic comb-like dispersant 5 | Basic comb-like dispersant 6 | Basic comb-like dispersant 7 |
|---|---|---|---|---|---|
| RAFT 723037 | 1 | 1 | 1 | 1 | 1 |
| Compound 1 | 34.8 | 34.8 | 34.8 | 34.8 | 34.8 |
| Methyl methacrylate | 5.8 | 5.8 | 5.8 | 5.8 | 5.8 |
| Dimethylaminoethyl methacrylate | 7.28 | 10.92 | | | |
| Glycidyl methacrylate | | | 0.95 | | |
| Acryloylmorpholine | | | | 6.54 | |
| Dimethyl acrylamide | | | | | 4.59 |
| Azobisisobutyronitrile | 0.24 | 0.24 | 0.24 | 0.24 | 0.24 |
| Fatty acid ester-based solvent 1 | 73.68 | 79.14 | 63.63 | 62.6 | 72.57 |

The materials shown in Table 5 are as follows.

RAFT 723037: 2-cyano-2-propyl dodecyl trithiocarbonate, manufactured by FUJIFILM Wako Pure Chemical Corporation Dimethylaminoethyl methacrylate: manufactured by Kyoeisha Chemical Co., Ltd.

Glycidyl methacrylate: manufactured by Kyoeisha Chemical Co., Ltd.

Acryloylmorpholine: manufactured by KJ Chemicals Corporation

Dimethyl acrylamide: manufactured by KJ Chemicals Corporation

Azobisisobutyronitrile: manufactured by FUJIFILM Wako Pure Chemical Corporation

<Synthesis of (Meth)Acrylic-Based Dispersants 1 to 6>

The monomer compositions of (meth)acrylic-based dispersants 1 to 6 are shown in Table 6. In each case, the monomers shown in Table 6 were mixed in the proportions shown in Table 6 to prepare a monomer mixture. In a separate preparation, a flask was charged with the fatty acid ester-based solvent 1, and the temperature was raised to 110° C. under stirring while the flask was flushed with nitrogen gas. Subsequently, Perbutyl 0 (t-butylperoxy 2-ethylhexanoate, manufactured by NOF Corporation) was added while the temperature was maintained at 100° C., and the prepared monomer mixture was then added dropwise over a period of three hours. With the temperature maintained at 110° C., additional Perbutyl 0 was added one hour after, and then two hours after, completion of the dropwise addition. The liquid temperature was then held at 110° C. for a further one hour. In addition, benzylethanolamine (manufactured by Tokyo Chemical Industry Co., Ltd.) was then added in the synthesis of the (meth)acrylic-based dispersant 3, and diethanolamine (manufactured by FUJIFILM Wako Pure Chemical Corporation) was added in the synthesis of the (meth)acrylic-based dispersant 4, in each case in an amount of one equivalent relative to the glycidyl methacrylate, and the mixture was then stirred at 110° C. for 3 hours. The (meth)acrylic-based dispersants 1 to 6 were each obtained as a solution having a solid fraction of 40%. In the syntheses of the (meth)acrylic-based dispersants 1 to 6, the amount of the fatty acid ester-based solvent 1 was adjusted so as to achieve a solid fraction of 40% in each case.

sion. The volatile component removal rate was substantially 100% by mass. This colored resin particles dispersion was used without further modification as an ink.

The compositions of the inks of Examples 1 to 29 and Comparative Example 4 following removal of the volatile components (namely, following solvent removal) are shown in Tables 13 to 18.

Inks of Comparative Examples 1 to 3 were produced in the manner described below.

The various components were mixed in accordance with the ink formulations shown in Table 12 and then dispersed using a beads mill (Dyno-Mill Multi LAB, manufactured by Shinmaru Enterprises Corporation). Following dispersion, an evaporator was used to remove the low-boiling point solvent (methyl ethyl ketone) from the dispersion. This

TABLE 6

| (% by mass) | (meth)acrylic-based dispersant 1 | (meth)acrylic-based dispersant 2 | (meth)acrylic-based dispersant 3 | (meth)acrylic-based dispersant 4 | (meth)acrylic-based dispersant 5 | (meth)acrylic-based dispersant 6 |
|---|---|---|---|---|---|---|
| Behenyl methacrylate | 50 | 50 | 50 | 50 | 50 | 50 |
| Lauryl methacrylate | 20 | 20 | 20 | 20 | 20 | 20 |
| Acetoacetoxyethyl methacrylate | 15 | 15 | 15 | 15 | 30 | |
| Dimethylaminoethyl methacrylate | 15 | | | | | 30 |
| Acryloylmorpholine | | 15 | | | | |
| Glycidyl methacrylate | | | 15 | 15 | | |

The materials shown in Table 6 are as follows.

Behenyl methacrylate: manufactured by NOF Corporation

Lauryl methacrylate: manufactured by Kao Corporation

Dimethylaminoethyl methacrylate: manufactured by FUJIFILM Wako Pure Chemical Corporation <Production of Inks>

Inks of Examples 1 to 29 and Comparative Example 4 were produced in the manner described below.

Non-aqueous solvents and dispersants were mixed together in the blend amounts shown in Tables 7 to 12 to prepare a continuous phase. Next, a colorant, a pigment dispersant and water were mixed in the blend amounts shown in Tables 7 to 12 and dispersed using a beads mill (Dyno-Mill Multi LAB, manufactured by Shinmaru Enterprises Corporation), a resin emulsion shown in Tables 7 to 12 was added to the obtained dispersion composition in the blend amount shown in Tables 7 to 12, and the resulting mixture was then stirred with a magnetic stirrer. As shown in Tables 7 to 12, a basic dispersant was used in Examples 1 to 28, an acidic dispersant was used in Example 29, and in Comparative Example 4, the (meth)acrylic-based dispersant 5 that was neither a basic dispersant nor an acidic dispersant was used.

With the continuous phase undergoing stirring with a magnetic stirrer, the mixture for the dispersed phase that had been premixed in the manner described above was added dropwise to the continuous phase while ice cooling and irradiation from an ultrasonic homogenizer "Ultrasonic Processor VC-750" (manufactured by Sonics & Materials, Inc.) were performed for 10 minutes, thus obtaining a water-in-oil (W/O) emulsion.

The water from the dispersed phase and the volatile components contained in the resin emulsion were removed from the obtained emulsion under reduced pressure using an evaporator, thus obtaining a colored resin particles dispercaused the pigment to be encapsulated by the urethane rein, yielding an ink containing an encapsulated pigment. The resin of the urethane resin c1 used in Comparative Example 1 dissolved in the non-aqueous solvent of Comparative Example 1, but the resin of the urethane resin c2 used in Comparative Examples 2 and 3 did not dissolve in the non-aqueous solvents of Comparative Examples 2 and 3.

The compositions of the inks of Comparative Examples 1 to 3 following removal of the solvent are shown in Table 18.

<Evaluation Methods>

Evaluations were performed in accordance with the following evaluation methods. The results are shown in Tables 13 to 18.

(1) Roller Transfer Contamination

One hundred printed items were obtained by using an inkjet printer ORPHIS GD9630 (manufactured by RISO KAGAKU CORPORATION) to print a solid image onto 100 sheets of a plain paper "RISO Paper Multi" (manufactured by RISO KAGAKU CORPORATION). The thus obtained 100 printed items were inspected visually and evaluated against the following criteria.

AA: almost no contamination is visible around the image periphery

A: slight contamination is visible around the image periphery

B: contamination is visible around the image periphery

C: contamination around the image periphery is marked (2) Image Density and Image Strike-Through Using an inkjet printer ORPHIS GD9630 (manufactured by RISO KAGAKU CORPORATION), a solid image was printed onto a plain paper "RISO Paper Multi" (manufactured by RISO KAGAKU CORPORATION). After 24 hours had elapsed following printing, the OD value of the printed surface of the printed item (the surface OD value) and the OD value of the rear surface of the printed item (the rear OD value) were measured using an optical densitometer and colorimeter (eXact, manufactured by X-Rite, Inc.). Based on the surface OD value, the image density was evaluated against the following criteria. Based on the rear OD value, image strike-through was evaluated against the following criteria. (Image density, evaluation criteria)

AAA: surface OD value of 1.25 or greater
AA: surface OD value of at least 1.20 but less than 1.25
A: surface OD value of at least 1.10 but less than 1.20
B: surface OD value of at least 1.00 but less than 1.10
C: surface OD value of less than 1.00

(Image Strike-Through, Evaluation Criteria)
AAA: rear OD value of less than 0.20
AA: rear OD value of at least 0.20 but less than 0.25
A: rear OD value of at least 0.25 but less than 0.35
B: rear OD value of at least 0.35 but less than 0.45
C: rear OD value of 0.45 or greater (3) Rub Fastness A printed item was produced in the same manner as that described for the above evaluation methods for the image density and image strike-through. Subsequently, 24 hours after printing, the solid image portion on the surface of the printed item was rubbed 5 times in 5 seconds with a white cotton cloth using a crockmeter (CM-1 manufactured by Atlas Electric Devices Co., Ltd.), and the level of contamination around the image periphery was evaluated against the following criteria.

(Evaluation criteria)
AA: almost no contamination is visible around the image periphery
A: slight contamination is visible around the image periphery
B: contamination is visible around the image periphery
C: contamination around the image periphery is marked (4) Storage Stability (70° C., 4 Weeks)

First, the viscosity of the ink was measured immediately following ink production.

Next, the ink was placed in a sealed container and left to stand at 70° C. for 4 weeks. Subsequently, the ink was sampled, and the ink viscosity was re-measured.

The ink viscosity refers to the viscosity at 23° C., and was measured using a Rheometer AR-G2 (manufactured by TA Instruments, Japan Inc.) at a cone angle of 2° and a diameter of 40 mm.

Based on the ink viscosity immediately following production and the ink viscosity after standing for 4 weeks, the following formula was used to determine the change in viscosity, and the storage stability was then evaluated against the criteria described below.

Change in viscosity (%)=[(ink viscosity after standing for 4 weeks×100)/(viscosity immediately following production)]−100(%)

(Evaluation Criteria)
AAA: change in viscosity of less than ±1.5%
AA: change in viscosity of at least ±1.5% but less than ±3%
A: change in viscosity of at least ±3% but less than ±6%
B: change in viscosity of at least ±6% but less than ±10%
C: change in viscosity of ±10% or more (5) Ink Viscosity The ink viscosity was evaluated against the following criteria. The ink viscosity refers to the viscosity at 23° C., and was measured using a Rheometer AR-G2 (manufactured by TA Instruments, Japan Inc.) at a cone angle of 2° and a diameter of 40 mm.

(Evaluation Criteria)
AAA: ink viscosity of less than 11.5 mPa·s
AA: ink viscosity of at least 11.5 mPa·s but less than 12 mPa·s
A: ink viscosity of at least 12 mPa·s but less than 13 mPa·s
B: ink viscosity of at least 13 mPa·s but less than 15 mPa·s
C: ink viscosity of 15 mPa·s or greater

TABLE 7

| | Prior to solvent removal (units: parts by mass) | Active component | Example 1 | Example 2 | Example 3 | Example 4 | Example 5 | Example 6 |
|---|---|---|---|---|---|---|---|---|
| Pigments | Carbon black | | 8.0 | 8.0 | 8.0 | 8.0 | 8.0 | 8.0 |
| | Phthalocyanine blue | | | | | | | |
| | Self-dispersing pigment | 20% | | | | | | |
| | Pigment dispersant | 100% | 2.0 | 2.0 | 2.0 | 2.0 | 2.0 | 2.0 |
| | Purified water | | 20.0 | 20.0 | 20.0 | 20.0 | 20.0 | 20.0 |
| Resin emulsions | Acidic urethane-urea 1 | 40% | 10.0 | 10.0 | 5.0 | 10.0 | 20.0 | 30.0 |
| | Acidic urethane-urea 2 | 40% | | | | | | |
| | Acidic urethane-urea 3 | 30% | | | | | | |
| | Acidic urethane-urea 4 | 38% | | | | | | |
| | Acidic urethane-urea 5 | 35% | | | | | | |
| | Nonionic urethane-urea 1 | 45% | | | | | | |
| | (Meth)acrylic resin 1 | 20% | | | | | | |
| Basic dispersants | Basic dispersant 1 | 100% | 2.5 | | | | | |
| | Basic dispersant 2 | 100% | | 2.5 | | | | |
| | Basic comb-like dispersant 1 | 40% | | | 6.3 | 6.3 | 6.3 | 6.3 |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |

TABLE 7-continued

| Prior to solvent removal (units: parts by mass) | | Active component | Example 1 | Example 2 | Example 3 | Example 4 | Example 5 | Example 6 |
|---|---|---|---|---|---|---|---|---|
| Non-aqueous solvents | Fatty acid ester-based solvent 1 | | 41.8 | 41.8 | 40.9 | 39.9 | 37.9 | |
| | Fatty acid ester-based solvent 2 | | | | | | | 35.9 |
| | Petroleum-based hydrocarbon solvent 1 | | 41.8 | 41.8 | 40.9 | 39.9 | 37.9 | 35.9 |
| | Petroleum-based hydrocarbon solvent 2 | | | | | | | |
| | Total | | 126.0 | 126.0 | 123.0 | 126.0 | 132.0 | 138.0 |

TABLE 8

| Prior to solvent removal (units: parts by mass) | | Active component | Example 7 | Example 8 | Example 9 | Example 10 | Example 11 | Example 12 |
|---|---|---|---|---|---|---|---|---|
| Pigments | Carbon black | | 8.0 | 8.0 | 8.0 | 8.0 | 8.0 | |
| | Phthalocyanine blue | | | | | | | |
| | Self-dispersing pigment | 20% | | | | | | 40.0 |
| | Pigment dispersant | 100% | 2.0 | 2.0 | 2.0 | 2.0 | 2.0 | |
| | Purified water | | 20.0 | 20.0 | 20.0 | 20.0 | 20.0 | |
| Resin emulsions | Acidic urethane-urea 1 | 40% | | | | | | 10.0 |
| | Acidic urethane-urea 2 | 40% | 10.0 | | | | | |
| | Acidic urethane-urea 3 | 30% | | 13.3 | | | | |
| | Acidic urethane-urea 4 | 38% | | | 10.5 | | | |
| | Acidic urethane-urea 5 | 35% | | | | 11.4 | | |
| | Nonionic urethane-urea 1 | 45% | | | | | 8.9 | |
| | (Meth)acrylic resin 1 | 20% | | | | | | |
| Basic dispersants | Basic dispersant 1 | 100% | | | | | | |
| | Basic dispersant 2 | 100% | | | | | | |
| | Basic comb-like dispersant 1 | 40% | 6.3 | 6.3 | 6.3 | 6.3 | 6.3 | 6.3 |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |
| Non-aqueous solvents | Fatty acid ester-based solvent 1 | | 39.9 | 39.9 | 39.9 | 39.9 | 39.9 | 40.9 |
| | Fatty acid ester-based solvent 2 | | | | | | | |
| | Petroleum-based hydrocarbon solvent 1 | | 39.9 | 39.9 | 39.9 | 39.9 | 39.9 | 40.9 |
| | Petroleum-based hydrocarbon solvent 2 | | | | | | | |
| | Total | | 126.0 | 129.3 | 126.5 | 127.4 | 124.9 | 138.0 |

TABLE 9

| Prior to solvent removal (units: parts by mass) | | Active component | Example 13 | Example 14 | Example 15 | Example 16 | Example 17 | Example 18 |
|---|---|---|---|---|---|---|---|---|
| Pigments | Carbon black | | | 8.0 | 8.0 | 8.0 | 8.0 | 8.0 |
| | Phthalocyanine blue | | 8.0 | | | | | |
| | Self-dispersing pigment | 20% | | | | | | |
| | Pigment dispersant | 100% | 2.0 | 2.0 | 2.0 | 2.0 | 2.0 | 2.0 |
| | Purified water | | 20.0 | 20.0 | 20.0 | 20.0 | 20.0 | 20.0 |
| Resin emulsions | Acidic urethane-urea 1 | 40% | 10.0 | 10.0 | 10.0 | 10.0 | 10.0 | 10.0 |
| | Acidic urethane-urea 2 | 40% | | | | | | |
| | Acidic urethane-urea 3 | 30% | | | | | | |
| | Acidic urethane-urea 4 | 38% | | | | | | |

TABLE 9-continued

| Prior to solvent removal (units: parts by mass) | | Active component | Example 13 | Example 14 | Example 15 | Example 16 | Example 17 | Example 18 |
|---|---|---|---|---|---|---|---|---|
| | Acidic urethane-urea 5 | 35% | | | | | | |
| | Nonionic urethane-urea 1 | 45% | | | | | | |
| | (Meth)acrylic resin 1 | 20% | | | | | | |
| Basic dispersants | Basic dispersant 1 | 100% | | | | | | |
| | Basic dispersant 2 | 100% | | | | | | |
| | Basic comb-like dispersant 1 | 40% | | | | | | |
| | Basic comb-like dispersant 2 | 40% | 6.3 | 6.3 | 6.3 | | | |
| | Basic comb-like dispersant 3 | 40% | | | | 6.3 | | |
| | Basic comb-like dispersant 4 | 40% | | | | | 6.3 | |
| | Basic comb-like dispersant 5 | 40% | | | | | | 6.3 |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |
| Non-aqueous solvents | Fatty acid ester-based solvent 1 | | | 79.8 | | 39.9 | 39.9 | 39.9 |
| | Fatty acid ester-based solvent 2 | | 39.9 | | | | | |
| | Petroleum-based hydrocarbon solvent 1 | | | | 79.8 | 39.9 | 39.9 | 39.9 |
| | Petroleum-based hydrocarbon solvent 2 | | 39.9 | | | | | |
| | Total | | 126.0 | 126.0 | 126.0 | 126.0 | 126.0 | 126.0 |

TABLE 10

| Prior to solvent removal (units: parts by mass) | | Active component | Example 19 | Example 20 | Example 21 | Example 22 | Example 23 | Example 24 |
|---|---|---|---|---|---|---|---|---|
| Pigments | Carbon black | | 8.0 | 8.0 | 8.0 | 8.0 | 8.0 | 8.0 |
| | Phthalocyanine blue | | | | | | | |
| | Self-dispersing pigment | 20% | | | | | | |
| | Pigment dispersant | 100% | 2.0 | 2.0 | 2.0 | 2.0 | 2.0 | 2.0 |
| | Purified water | | 20.0 | 20.0 | 20.0 | 20.0 | 20.0 | 20.0 |
| Resin emulsions | Acidic urethane-urea 1 | 40% | 10.0 | 10.0 | 10.0 | 10.0 | 10.0 | 10.0 |
| | Acidic urethane-urea 2 | 40% | | | | | | |
| | Acidic urethane-urea 3 | 30% | | | | | | |
| | Acidic urethane-urea 4 | 38% | | | | | | |
| | Acidic urethane-urea 5 | 35% | | | | | | |
| | Nonionic urethane-urea 1 | 45% | | | | | | |
| | (Meth)acrylic resin 1 | 20% | | | | | | |
| Basic dispersants | Basic dispersant 1 | 100% | | | | | | |
| | Basic dispersant 2 | 100% | | | | | | |
| | Basic comb-like dispersant 1 | 40% | | | | | | |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | 6.3 | | | | | |
| | Basic comb-like dispersant 7 | 40% | | 6.3 | | | | |
| | (Meth)acrylic-based dispersant 1 | 40% | | | 6.3 | | | |
| | (Meth)acrylic-based dispersant 2 | 40% | | | | 6.3 | | |
| | (Meth)acrylic-based dispersant 3 | 40% | | | | | 6.3 | |
| | (Meth)acrylic-based dispersant 4 | 40% | | | | | | 6.3 |
| Non-aqueous solvents | Fatty acid ester-based solvent 1 | | 39.9 | 39.9 | 39.9 | 39.9 | 39.9 | 39.9 |
| | Fatty acid ester-based solvent 2 | | | | | | | |

TABLE 10-continued

| Prior to solvent removal (units: parts by mass) | | Active component | Example 19 | Example 20 | Example 21 | Example 22 | Example 23 | Example 24 |
|---|---|---|---|---|---|---|---|---|
| | Petroleum-based hydrocarbon solvent 1 | | 39.9 | 39.9 | 39.9 | 39.9 | 39.9 | 39.9 |
| | Petroleum-based hydrocarbon solvent 2 | | | | | | | |
| | Total | | 126.0 | 126.0 | 126.0 | 126.0 | 126.0 | 126.0 |

TABLE 11

| Prior to solvent removal (units: parts by mass) | | Active component | Example 25 | Example 26 | Example 27 | Example 28 | Example 29 |
|---|---|---|---|---|---|---|---|
| Pigments | Carbon black | | 8.0 | 8.0 | 8.0 | 8.0 | 8.0 |
| | Phthalocyanine blue | | | | | | |
| | Self-dispersing pigment | 20% | | | | | |
| | Pigment dispersant | 100% | 2.0 | 2.0 | 2.0 | 2.0 | 2.0 |
| | Purified water | | 20.0 | 20.0 | 20.0 | 20.0 | 20.0 |
| Resin emulsions | Acidic urethane-urea 1 | 40% | 10.0 | 7.5 | 5.0 | 2.5 | |
| | Acidic urethane-urea 2 | 40% | | | | | |
| | Acidic urethane-urea 3 | 30% | | | | | |
| | Acidic urethane-urea 4 | 38% | | | | | |
| | Acidic urethane-urea 5 | 35% | | | | | |
| | Basic urethane-urea 1 | 30% | | | | | 13.3 |
| | Nonionic urethane-urea 1 | 45% | | | | | |
| | (Meth)acrylic resin 1 | 20% | | 5.0 | 10.0 | 15.0 | |
| Basic dispersants | Basic dispersant 1 | 100% | | | | | |
| | Basic dispersant 2 | 100% | | | | | |
| | Basic comb-like dispersant 1 | 40% | 1.3 | 6.3 | 6.3 | 6.3 | |
| | Basic comb-like dispersant 2 | 40% | | | | | |
| | Basic comb-like dispersant 3 | 40% | | | | | |
| | Basic comb-like dispersant 4 | 40% | | | | | |
| | Basic comb-like dispersant 5 | 40% | | | | | |
| | Basic comb-like dispersant 6 | 40% | | | | | |
| | Basic comb-like dispersant 7 | 40% | | | | | |
| | (Meth)acrylic-based dispersant 1 | 40% | 5.0 | | | | |
| | (Meth)acrylic-based dispersant 2 | 40% | | | | | |
| | (Meth)acrylic-based dispersant 3 | 40% | | | | | |
| | (Meth)acrylic-based dispersant 4 | 40% | | | | | |
| Acidic dispersant | Acidic dispersant 1 | 100% | | | | | 2.5 |
| Non-aqueous solvents | Fatty acid ester-based solvent 1 | | 39.9 | 39.9 | 39.9 | 39.9 | 41.8 |
| | Fatty acid ester-based solvent 2 | | | | | | |
| | Petroleum-based hydrocarbon solvent 1 | | 39.9 | 39.9 | 39.9 | 39.9 | 41.8 |
| | Petroleum-based hydrocarbon solvent 2 | | | | | | |
| | Total | | 126.0 | 128.5 | 131.0 | 133.5 | 129.4 |

TABLE 12

| Prior to solvent removal (units: parts by mass) | | Active component | Comparative Example 1 | Comparative Example 2 | Comparative Example 3 | Comparative Example 4 |
|---|---|---|---|---|---|---|
| Pigment | Carbon black | | 8.0 | 8.0 | 8.0 | 8.0 |
| | Pigment dispersant | 100% | | | 2.0 | |
| | Purified water | | | | | 20.0 |
| Resin emulsion | Acidic urethane-urea 1 | 40% | | | | 10.0 |
| Urethane resins | Urethane resin solution c1 | 50% | 8.0 | | | |
| | Urethane resin solution c2 | 50% | | 8.0 | 8.0 | |

TABLE 12-continued

| Prior to solvent removal (units: parts by mass) | | Active component | Comparative Example 1 | Comparative Example 2 | Comparative Example 3 | Comparative Example 4 |
|---|---|---|---|---|---|---|
| Basic dispersant | Basic comb-like dispersant 1 | 40% | 6.3 | 6.3 | 6.3 | |
| Dispersant | (Meth)acrylic-based dispersant 5 | 40% | | | | 6.3 |
| Non-aqueous solvents | Fatty acid ester-based solvent 1 | | 40.9 | 40.9 | 39.9 | 40.9 |
| | Petroleum-based hydrocarbon solvent 1 | | 40.9 | 40.9 | 39.9 | 40.9 |
| | Total | | 104.0 | 104.0 | 104.0 | 126.0 |

TABLE 13

| Following solvent removal (units: % by mass) | | Active component | Example 1 | Example 2 | Example 3 | Example 4 | Example 5 | Example 6 |
|---|---|---|---|---|---|---|---|---|
| Pigments | Carbon black | | 8.0 | 8.0 | 8.0 | 8.0 | 8.0 | 8.0 |
| | Phthalocyanine blue | | | | | | | |
| | Self-dispersing pigment | 100% | | | | | | |
| | Pigment dispersant | 100% | 2.0 | 2.0 | 2.0 | 2.0 | 2.0 | 2.0 |
| | Purified water | | | | | | | |
| Resins | Acidic urethane-urea 1 | 100% | 4.0 | 4.0 | 2.0 | 4.0 | 8.0 | 12.0 |
| | Acidic urethane-urea 2 | 100% | | | | | | |
| | Acidic urethane-urea 3 | 100% | | | | | | |
| | Acidic urethane-urea 4 | 100% | | | | | | |
| | Acidic urethane-urea 5 | 100% | | | | | | |
| | Nonionic urethane-urea 1 | 100% | | | | | | |
| | (Meth)acrylic resin 1 | 100% | | | | | | |
| Basic dispersants | Basic dispersant 1 | 100% | 2.5 | | | | | |
| | Basic dispersant 2 | 100% | | 2.5 | | | | |
| | Basic comb-like dispersant 1 | 40% | | | 6.3 | 6.3 | 6.3 | 6.3 |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |
| Non-aqueous solvents | Fatty acid ester-based solvent 1 | | 41.8 | 41.8 | 40.9 | 39.9 | 37.9 | |
| | Fatty acid ester-based solvent 2 | | | | | | | 35.9 |
| | Petroleum-based hydrocarbon solvent 1 | | 41.8 | 41.8 | 40.9 | 39.9 | 37.9 | 35.9 |
| | Petroleum-based hydrocarbon solvent 2 | | | | | | | |
| | Total | | 100.0 | 100.0 | 100.0 | 100.0 | 100.0 | 100.0 |
| Evaluation results | | | | | | | | |
| | Roller transfer contamination | | A | A | A | A | A | A |
| | Rub fastness | | A | A | A | A | AA | AA |
| | Image density | | A | A | AA | AA | AA | AA |
| | Image strike-through | | A | A | B | A | AA | AA |
| | Ink storage stability | | B | B | A | AA | AA | AA |
| | Ink viscosity | | B | B | AA | A | B | B |

TABLE 14

| Following solvent removal (units: % by mass) | | Active component | Example 7 | Example 8 | Example 9 | Example 10 | Example 11 | Example 12 |
|---|---|---|---|---|---|---|---|---|
| Pigments | Carbon black | | 8.0 | 8.0 | 8.0 | 8.0 | 8.0 | |
| | Phthalocyanine blue | | | | | | | |
| | Self-dispersing pigment | 100% | | | | | | 8.0 |
| | Pigment dispersant | 100% | 2.0 | 2.0 | 2.0 | 2.0 | 2.0 | |
| | Purified water | | | | | | | |

TABLE 14-continued

| Following solvent removal (units: % by mass) | | Active component | Example 7 | Example 8 | Example 9 | Example 10 | Example 11 | Example 12 |
|---|---|---|---|---|---|---|---|---|
| Resins | Acidic urethane-urea 1 | 100% | | | | | | |
| | Acidic urethane-urea 2 | 100% | 4.0 | | | | | 4.0 |
| | Acidic urethane-urea 3 | 100% | | 4.0 | | | | |
| | Acidic urethane-urea 4 | 100% | | | 4.0 | | | |
| | Acidic urethane-urea 5 | 100% | | | | 4.0 | | |
| | Nonionic urethane-urea 1 | 100% | | | | | 4.0 | |
| | (Meth)acrylic resin 1 | 100% | | | | | | |
| Basic dispersants | Basic dispersant 1 | 100% | | | | | | |
| | Basic dispersant 2 | 100% | | | | | | |
| | Basic comb-like dispersant 1 | 40% | 6.3 | 6.3 | 6.3 | 6.3 | 6.3 | 6.3 |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |
| Non-aqueous solvents | Fatty acid ester-based solvent 1 | | 39.9 | 39.9 | 39.9 | 39.9 | 39.9 | 40.9 |
| | Fatty acid ester-based solvent 2 | | | | | | | |
| | Petroleum-based hydrocarbon solvent 1 | | 39.9 | 39.9 | 39.9 | 39.9 | 39.9 | 40.9 |
| | Petroleum-based hydrocarbon solvent 2 | | | | | | | |
| | Total | | 100.0 | 100.0 | 100.0 | 100.0 | 100.0 | 100.0 |
| Evaluation results | | | | | | | | |
| | Roller transfer contamination | | A | A | A | A | B | A |
| | Rub fastness | | AA | A | A | A | B | A |
| | Image density | | AA | A | AA | AA | A | A |
| | Image strike-through | | A | A | A | A | A | A |
| | Ink storage stability | | AA | A | A | AA | A | A |
| | Ink viscosity | | AA | A | A | A | B | A |

TABLE 15

| Following solvent removal (units: % by mass) | | Active component | Example 13 | Example 14 | Example 15 | Example 16 | Example 17 | Example 18 |
|---|---|---|---|---|---|---|---|---|
| Pigments | Carbon black | | | 8.0 | 8.0 | 8.0 | 8.0 | 8.0 |
| | Phthalocyanine blue | | 8.0 | | | | | |
| | Self-dispersing pigment | 100% | | | | | | |
| | Pigment dispersant | 100% | 2.0 | 2.0 | 2.0 | 2.0 | 2.0 | 2.0 |
| | Purified water | | | | | | | |
| Resins | Acidic urethane-urea 1 | 100% | 4.0 | 4.0 | 4.0 | 4.0 | 4.0 | 4.0 |
| | Acidic urethane-urea 2 | 100% | | | | | | |
| | Acidic urethane-urea 3 | 100% | | | | | | |
| | Acidic urethane-urea 4 | 100% | | | | | | |
| | Acidic urethane-urea 5 | 100% | | | | | | |
| | Nonionic urethane-urea 1 | 100% | | | | | | |
| | (Meth)acrylic resin 1 | 100% | | | | | | |
| Basic dispersants | Basic dispersant 1 | 100% | | | | | | |
| | Basic dispersant 2 | 100% | | | | | | |
| | Basic comb-like dispersant 1 | 40% | | | | | | |
| | Basic comb-like dispersant 2 | 40% | 6.3 | 6.3 | 6.3 | | | |
| | Basic comb-like dispersant 3 | 40% | | | | 6.3 | | |
| | Basic comb-like dispersant 4 | 40% | | | | | 6.3 | |
| | Basic comb-like dispersant 5 | 40% | | | | | | 6.3 |
| | Basic comb-like dispersant 6 | 40% | | | | | | |
| | Basic comb-like dispersant 7 | 40% | | | | | | |
| | (Meth)acrylic-based dispersant 1 | 40% | | | | | | |
| | (Meth)acrylic-based dispersant 2 | 40% | | | | | | |
| | (Meth)acrylic-based dispersant 3 | 40% | | | | | | |
| | (Meth)acrylic-based dispersant 4 | 40% | | | | | | |
| Non-aqueous solvents | Fatty acid ester-based solvent 1 | | | 79.8 | | 39.9 | 39.9 | 39.9 |
| | Fatty acid ester-based solvent 2 | | 39.9 | | | | | |
| | Petroleum-based hydrocarbon solvent 1 | | | | 79.8 | 39.9 | 39.9 | 39.9 |

TABLE 15-continued

| Following solvent removal (units: % by mass) | Active component | Example 13 | Example 14 | Example 15 | Example 16 | Example 17 | Example 18 |
|---|---|---|---|---|---|---|---|
| Petroleum-based hydrocarbon solvent 2 | | 39.9 | | | | | |
| Total | | 100.0 | 100.0 | 100.0 | 100.0 | 100.0 | 100.0 |
| Evaluation results | | | | | | | |
| Roller transfer contamination | | A | A | A | A | A | A |
| Rub fastness | | A | A | A | A | A | A |
| Image density | | A | A | A | AA | AA | AA |
| Image strike-through | | AA | A | AA | A | A | A |
| Ink storage stability | | A | A | A | AA | AA | AA |
| Ink viscosity | | A | A | A | A | A | A |

TABLE 16

| | Following solvent removal (units: % by mass) | Active component | Example 19 | Example 20 | Example 21 | Example 22 | Example 23 | Example 24 |
|---|---|---|---|---|---|---|---|---|
| Pigments | Carbon black | | 8.0 | 8.0 | 8.0 | 8.0 | 8.0 | 8.0 |
| | Phthalocyanine blue | | | | | | | |
| | Self-dispersing pigment | 100% | | | | | | |
| | Pigment dispersant | 100% | 2.0 | 2.0 | 2.0 | 2.0 | 2.0 | 2.0 |
| | Purified water | | | | | | | |
| Resins | Acidic urethane-urea 1 | 100% | 4.0 | 4.0 | 4.0 | 4.0 | 4.0 | 4.0 |
| | Acidic urethane-urea 2 | 100% | | | | | | |
| | Acidic urethane-urea 3 | 100% | | | | | | |
| | Acidic urethane-urea 4 | 100% | | | | | | |
| | Acidic urethane-urea 5 | 100% | | | | | | |
| | Nonionic urethane-urea 1 | 100% | | | | | | |
| | (Meth)acrylic resin 1 | 100% | | | | | | |
| Basic dispersants | Basic dispersant 1 | 100% | | | | | | |
| | Basic dispersant 2 | 100% | | | | | | |
| | Basic comb-like dispersant 1 | 40% | | | | | | |
| | Basic comb-like dispersant 2 | 40% | | | | | | |
| | Basic comb-like dispersant 3 | 40% | | | | | | |
| | Basic comb-like dispersant 4 | 40% | | | | | | |
| | Basic comb-like dispersant 5 | 40% | | | | | | |
| | Basic comb-like dispersant 6 | 40% | 6.3 | | | | | |
| | Basic comb-like dispersant 7 | 40% | | 6.3 | | | | |
| | (Meth)acrylic-based dispersant 1 | 40% | | | 6.3 | | | |
| | (Meth)acrylic-based dispersant 2 | 40% | | | | 6.3 | | |
| | (Meth)acrylic-based dispersant 3 | 40% | | | | | 6.3 | |
| | (Meth)acrylic-based dispersant 4 | 40% | | | | | | 6.3 |
| Non-aqueous solvents | Fatty acid ester-based solvent 1 | | 39.9 | 39.9 | 39.9 | 39.9 | 39.9 | 39.9 |
| | Fatty acid ester-based solvent 2 | | | | | | | |
| | Petroleum-based hydrocarbon solvent 1 | | 39.9 | 39.9 | 39.9 | 39.9 | 39.9 | 39.9 |
| | Petroleum-based hydrocarbon solvent 2 | | | | | | | |
| | Total | | 100.0 | 100.0 | 100.0 | 100.0 | 100.0 | 100.0 |
| | Evaluation results | | | | | | | |
| | Roller transfer contamination | | A | A | AA | AA | AA | AA |
| | Rub fastness | | A | A | A | A | AA | AA |
| | Image density | | AA | AA | AA | AA | AAA | AAA |
| | Image strike-through | | A | A | A | A | AA | AAA |
| | Ink storage stability | | AA | AA | AA | AA | AA | AAA |
| | Ink viscosity | | A | A | AA | AA | AA | AAA |

TABLE 17

| | Following solvent removal (units: % by mass) | Active component | Example 25 | Example 26 | Example 27 | Example 28 | Example 29 |
|---|---|---|---|---|---|---|---|
| Pigments | Carbon black | | 8.0 | 8.0 | 8.0 | 8.0 | 8.0 |
| | Phthalocyanine blue | | | | | | |
| | Self-dispersing pigment | 100% | | | | | |

TABLE 17-continued

| Following solvent removal (units: % by mass) | | Active component | Example 25 | Example 26 | Example 27 | Example 28 | Example 29 |
|---|---|---|---|---|---|---|---|
| | Pigment dispersant | 100% | 2.0 | 2.0 | 2.0 | 2.0 | 2.0 |
| | Purified water | | | | | | |
| Resins | Acidic urethane-urea 1 | 100% | 4.0 | 3.0 | 2.0 | 1.0 | |
| | Acidic urethane-urea 2 | 100% | | | | | |
| | Acidic urethane-urea 3 | 100% | | | | | |
| | Acidic urethane-urea 4 | 100% | | | | | |
| | Acidic urethane-urea 5 | 100% | | | | | |
| | Basic urethane-urea 1 | 100% | | | | | 4.0 |
| | Nonionic urethane-urea 1 | 100% | | | | | |
| | (Meth)acrylic resin 1 | 100% | | 1.0 | 2.0 | 3.0 | |
| Basic dispersants | Basic dispersant 1 | 100% | | | | | |
| | Basic dispersant 2 | 100% | | | | | |
| | Basic comb-like dispersant 1 | 40% | 1.3 | 6.3 | 6.3 | 6.3 | |
| | Basic comb-like dispersant 2 | 40% | | | | | |
| | Basic comb-like dispersant 3 | 40% | | | | | |
| | Basic comb-like dispersant 4 | 40% | | | | | |
| | Basic comb-like dispersant 5 | 40% | | | | | |
| | Basic comb-like dispersant 6 | 40% | | | | | |
| | Basic comb-like dispersant 7 | 40% | | | | | |
| | (Meth)acrylic-based dispersant 1 | 40% | 5.0 | | | | |
| | (Meth)acrylic-based dispersant 2 | 40% | | | | | |
| | (Meth)acrylic-based dispersant 3 | 40% | | | | | |
| | (Meth)acrylic-based dispersant 4 | 40% | | | | | |
| Acidic dispersant | Acidic dispersant 1 | 100% | | | | | 2.5 |
| Non-aqueous solvents | Fatty acid ester-based solvent 1 | | 39.9 | 39.9 | 39.9 | 39.9 | 41.8 |
| | Fatty acid ester-based solvent 2 | | | | | | |
| | Petroleum-based hydrocarbon solvent 1 | | 39.9 | 39.9 | 39.9 | 39.9 | 41.8 |
| | Petroleum-based hydrocarbon solvent 2 | | | | | | |
| | Total | | 100.0 | 100.0 | 100.0 | 100.0 | 100.0 |
| Evaluation results | | | | | | | |
| | Roller transfer contamination | | AA | A | A | A | A |
| | Rub fastness | | AA | AA | AA | AA | B |
| | Image density | | AAA | AA | AA | AA | A |
| | Image strike-through | | AA | AA | AA | AA | A |
| | Ink storage stability | | AAA | AA | AA | AA | B |
| | Ink viscosity | | AA | AA | AA | AA | B |

TABLE 18

| Following solvent removal (units: % by mass) | | Active component | Comparative Example 1 | Comparative Example 2 | Comparative Example 3 | Comparative Example 4 |
|---|---|---|---|---|---|---|
| Pigment | Carbon black | | 8.0 | 8.0 | 8.0 | 8.0 |
| | Pigment dispersant | 100% | | | 2.0 | |
| | Purified water | | | | | |
| Resins | Acidic urethane-urea 1 | 100% | | | | 4.0 |
| | Urethane resin solution c1 | 100% | 4.0 | | | |
| | Urethane resin solution c2 | 100% | | 4.0 | 4.0 | |
| Basic dispersant | Basic comb-like dispersant 1 | 40% | 6.3 | 6.3 | 6.3 | |
| Dispersant | (Meth)acrylic-based dispersant 5 | 40% | | | | 6.3 |
| Non-aqueous solvents | Fatty acid ester-based solvent 1 | | 40.9 | 40.9 | 39.9 | 40.9 |
| | Petroleum-based hydrocarbon solvent 1 | | 40.9 | 40.9 | 39.9 | 40.9 |
| Total | | | 100.0 | 100.0 | 100.0 | 100.0 |
| Evaluation results | | | | | | |
| | Roller transfer contamination | | C | C | C | C |
| | Rub fastness | | C | C | C | C |
| | Image density | | B | B | B | C |
| | Image strike-through | | B | C | C | A |
| | Ink storage stability | | B | A | A | C |
| | Ink viscosity | | C | C | C | C |

As shown in the above tables, the ink of each example exhibited a superior result for the roller transfer contamination evaluation compared with all of the inks of the comparative examples. Moreover specifically, the ink of each example exhibited a superior result for the roller transfer contamination evaluation compared with Comparative Examples 1 to 3 which used a urethane resin that was not a urethane-urea resin, and Comparative Example 4 which used a dispersant that was not an ionic dispersant.

Further, the ink of each example also exhibited a superior result in the rub fastness evaluation compared with the inks of the comparative examples.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising colored resin particles, an ionic dispersant and a non-aqueous solvent, wherein
the colored resin particles comprise a colorant and a urethane-urea resin.

2. The oil-based inkjet ink according to claim 1, wherein the urethane-urea resin comprises a urethane-urea resin having an acidic group.

3. The oil-based inkjet ink according to claim 1, wherein the ionic dispersant comprises a basic dispersant.

4. The oil-based inkjet ink according to claim 3, wherein the basic dispersant comprises a basic dispersant that is a polymer having a basic group and having a plurality of side chains.

5. The oil-based inkjet ink according to claim 4, wherein the plurality of side chains comprises a plurality of side chains that contain a polyester portion.

6. The oil-based inkjet ink according to claim 4, wherein the basic dispersant comprises a basic dispersant that is a polymer having a main chain containing a polyamine skeleton.

7. The oil-based inkjet ink according to claim 3, wherein the basic dispersant comprises a basic dispersant that is a basic (meth)acrylic resin having a basic group, a β-dicarbonyl group and an alkyl group.

8. The oil-based inkjet ink according to claim 1, wherein the colored resin particles further comprise a water-soluble nonionic dispersant.

9. The oil-based inkjet ink according to claim 1, wherein the colored resin particles further comprise a (meth)acrylic resin having an acidic group.

10. A method for producing an oil-based inkjet ink, the method comprising:
producing a water-in-oil emulsion comprising a continuous phase that comprises a non-aqueous solvent and an ionic dispersant, and a dispersed phase that comprises water, a colorant and a water-dispersible urethane-urea resin, and
removing the water from the water-in-oil emulsion, whereby dispersed colored resin paticles are present in the continuous phase.

11. The method for producing an oil-based inkjet ink according to claim 10, wherein the water-dispersible urethane-urea resin comprises a water-dispersible urethane-urea resin having an acidic group.

12. The method for producing an oil-based inkjet ink according to claim 10, wherein the ionic dispersant comprises a basic dispersant.

13. The method for producing an oil-based inkjet ink according to claim 12, wherein the basic dispersant comprises a basic dispersant that is a polymer having a basic group and having a plurality of side chains.

14. The method for producing an oil-based inkjet ink according to claim 13, wherein the basic dispersant comprises a basic dispersant that is a polymer having a main chain containing a polyamine skeleton.

15. The method for producing an oil-based inkjet ink according to claim 12, wherein the basic dispersant comprises a basic dispersant that is a basic (meth)acrylic resin having a basic group, a β-dicarbonyl group and an alkyl group.

16. The method for producing an oil-based inkjet ink according to claim 13, wherein the plurality of side chains comprises a plurality of side chains that contain a polyester portion.

17. The method for producing an oil-based inkjet ink according to claim 10, wherein the colored resin particles further comprise a water-soluble nonionic dispersant.

18. The method for producing an oil-based inkjet ink according to claim 10, wherein the colored resin particles further comprise a (meth)acrylic resin having an acidic group.

* * * * *